United States Patent

[11] 3,573,451

[72] Inventors Louis H. Fricke, Jr.
St. Louis;
Robert A. Walsh, Richmond Heights, Mo.
[21] Appl. No. 870,812
[22] Filed Aug. 25, 1969
Division of Ser. No. 495,565, Oct. 13, 1965,
Pat. No. 3,505,512.
[45] Patented Apr. 6, 1971
[73] Assignee Monsanto Company
St. Louis, Mo.

[54] FUNCTION GENERATOR FOR PRODUCING SQUARE AND RAMP WAVE PULSES
4 Claims, 15 Drawing Figs.
[52] U.S. Cl. ....................................................... 235/197,
328/127, 328/36
[51] Int. Cl. ...................................................... G06g 7/26
[50] Field of Search ............................................. 235/197,
183, 184; 328/180, 181, 182, 183, 184, 185, 127,
34, 35, 36; 307/(Inquired)

[56] References Cited
UNITED STATES PATENTS
3,255,416 6/1966 Stella ............................. 328/36
3,500,445 3/1970 Collings ........................ 235/197

*Primary Examiner*—Malcolm A. Morrison
*Assistant Examiner*—Joseph F. Ruggiero
*Attorneys*—Robert J. Schapp, Joseph D. Kennedy and John D. Upham ABSTRACT: A rapid process simulator for determining both static and the dynamic characteristics which are unknown in a relatively stable process. The simulator includes a pulse generator for producing a perturbating pulse which is applied to the process. The perturbating pulse produces an output signal which can be expressed in the form of a polynomial. The process is compared in the simulator with a model of orthogonal functions which are capable of being normalized to an orthonormal condition. The model is formulated with the idea of choosing a pulse input in such a way as to facilitate the construction of the system. An output signal is also produced in the model which is in turn compared with the output signal from the process in order to achieve an error signal. This signal is squared in the simulator and integrated to determine the characteristics of the system. The simulator includes a transport delay device for delaying the perturbating pulse to the model with respect to the process, so that the output of the process and the model will begin in coincident times. In addition, the simulator is provided with a generator to produce oscillatory transients on a model of the signal to match transient on the process signal.

INVENTORS
LOUIS H. FRICKE, JR.
ROBERT A. WALSH

Robert J. Schaap
ATTORNEY

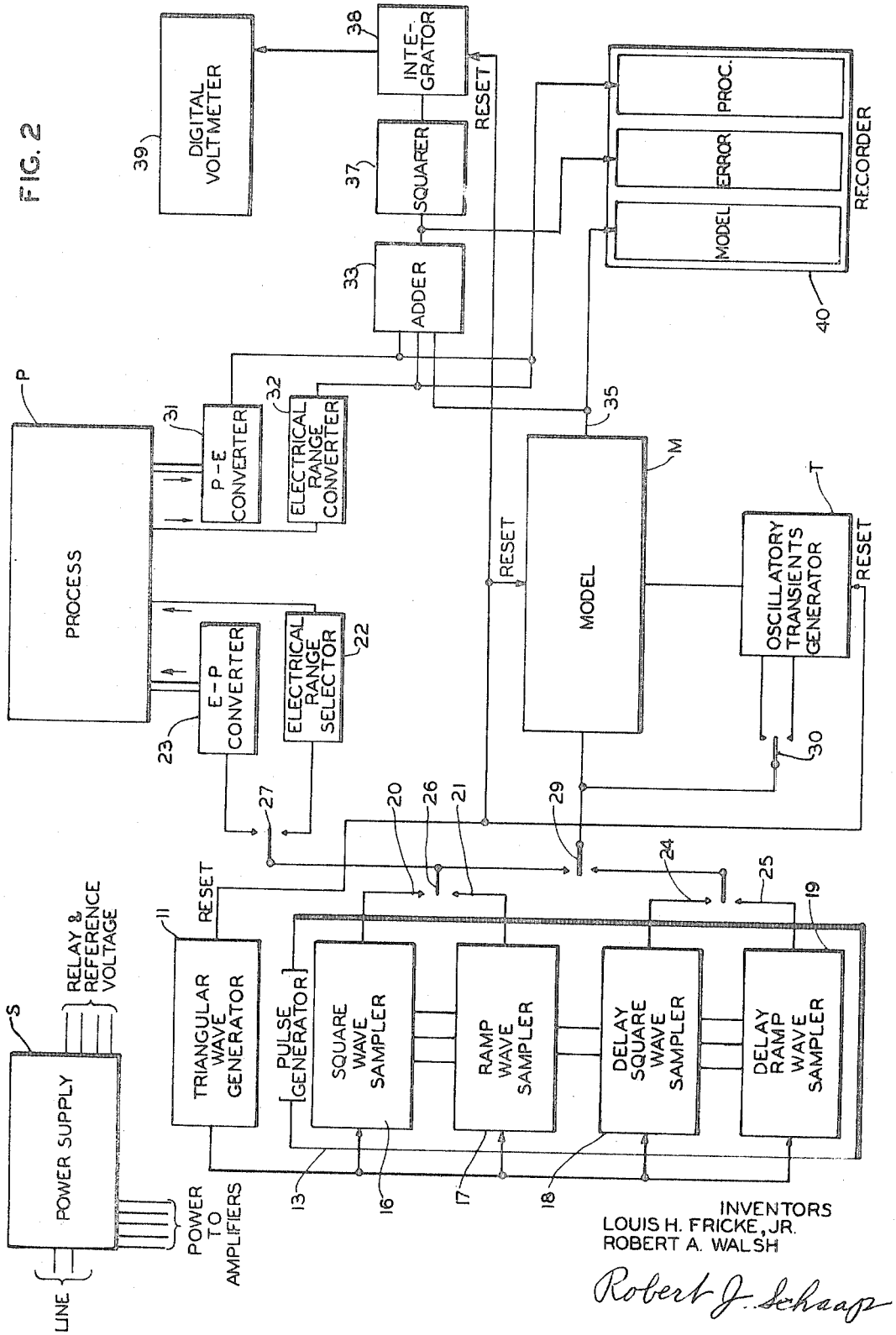

INVENTORS
LOUIS H. FRICKE, JR.
ROBERT A. WALSH

Robert J. Schaap

ATTORNEY

INVENTORS
LOUIS H. FRICKE, JR.
ROBERT A. WALSH

*Robert J. Scharp*

ATTORNEY

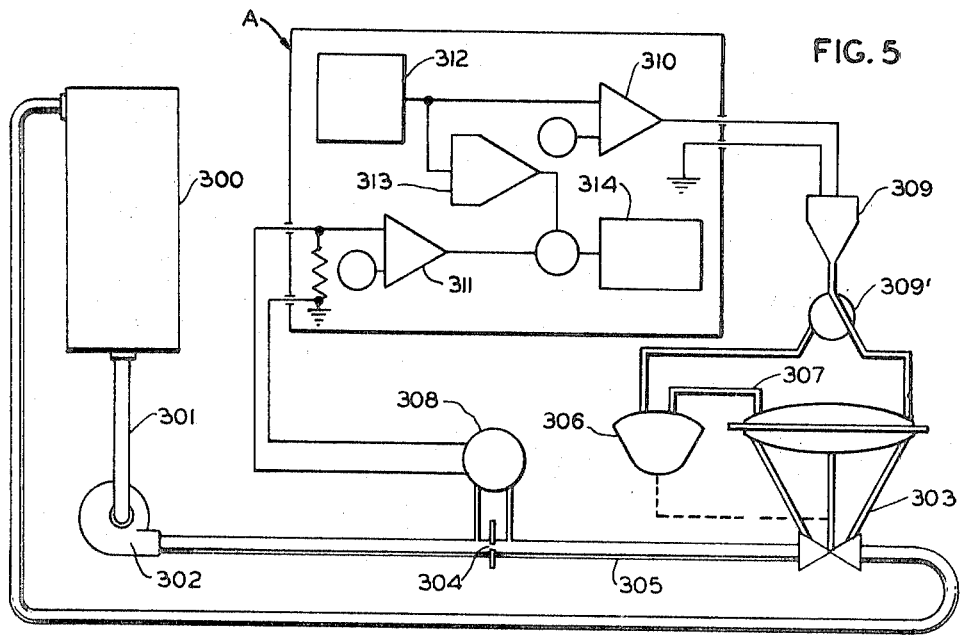
FIG. 5
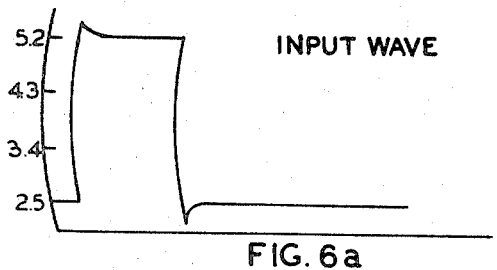
FIG. 6a — INPUT WAVE
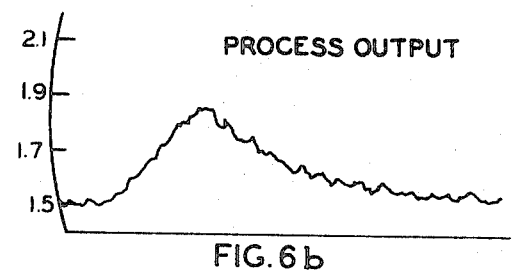
FIG. 6b — PROCESS OUTPUT
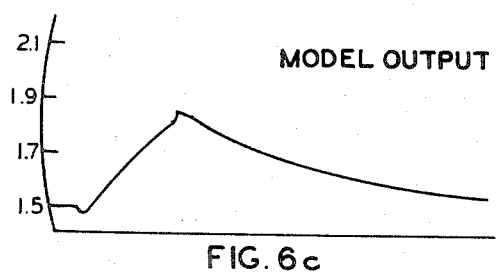
FIG. 6c — MODEL OUTPUT
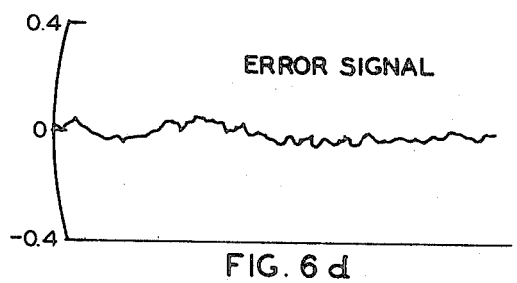
FIG. 6d — ERROR SIGNAL
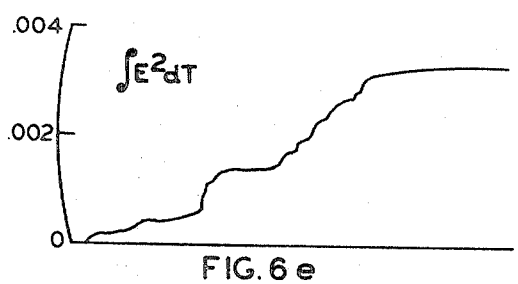
FIG. 6e — $\int E^2 dT$
INVENTORS
LOUIS H. FRICKE, JR.
ROBERT A. WALSH
*Robert J. Schapp*
ATTORNEY

FUNCTION GENERATOR FOR PRODUCING SQUARE AND RAMP WAVE PULSES

This application is a division of our copending application Ser. No. 495,565, filed Oct. 13, 1965, and now U.S. Pat. No. 3,505,512.

This invention relates in general to certain new and useful improvements in computer devices for determining process characteristics, and more particularly to a rapid process simulator which is capable of simulating process conditions, and comparing the process conditions against a known model of orthogonal functions.

In the design and development of controlled processes, there are two areas of intense activity. The first of these areas lies in the theoretical simulation of the total plant and the second of these activities lies in the empirical simulations involving the collection of reliable experimental data to assist in the construction of a special purpose model. The simulation of a newly proposed process, even from the best available theoretical basis is usually only an approximate simulation. In most cases, it requires the employment of large and expensive computer installations, either analog and/or digital computers so that by direct programming of design criteria, the optimum plant operating conditions may be determined. These operating conditions may then be used to construct a pilot plant scale model. However, even if the model were reliable, the scale-up problems produced are quite complex. In many cases, it is almost impossible to maintain exact relationships between intrinsic parameters such as surface tension, heat transfer, etc. It is well established that few theoretical models presently existing can anticipate all of the significant process characteristics. As a result of these complexities, many full scale plants are in need of partial redesign.

All of the presently available modes of analyzing operating processes involve disturbing the process and determining the reaction from the disturbance. The presently available methods generally employ a sinusoidal type of process change when attempting to obtain process characterization. However, delays between the input signal and the output of the process may take a number of days. In fact, complete tests often take months with the resultant upsetting of production. The newer method of disturbing a process is through the use of a controlled pulse. The pulse is generally selected so that some of its harmonics can produce a response of process output which yields all of the information that the sinusoidal techniques yield.

These pulse inputs and outputs can then be recorded and the data changed mathematically to Fourier transforms. The performance function, which is the ratio of output to input in this transform, is the measure of the frequency response of the entire system. This frequency response can, in turn, be depicted as a linear expression to show the relationship of input to output. This equation representing the performance function represents the model in an analog-type of simulation. The procedure for fitting this linear model to a nonlinear system is sufficient to permit the devising of a correct control system within the normal range of operating conditions. However, Fourier analysis has the drawback of being difficult to perform in commercially operating plants and this fact makes a rapid description of the process difficult to obtain, if not unavailable. Moreover, if the process is complex and difficult to describe, the techniques presently employed are not able to describe all of the existing process characteristics. It is generally necessary to acquire the data from the process, to prepare the data in a form for transformation by means of digital computer and then developing Fourier transforms for the various signals to determine the harmonic values of the different frequencies. In general, it is often very difficult to give a precise physical interpretation of the various parameters affecting the process from measurements in the field, when the process characteristics must be determined by use of both analog and digital computer techniques.

It is, therefore, the primary object of the present invention to provide a rapid process simulator for providing a determination of the dynamic characteristics of an actual process.

It is another object of the present invention to provide a rapid process simulator of the type stated which is capable of determining both static and dynamic characteristics of a process by comparing process conditions to an established model and measuring the deviation therefrom.

It is a further object of the present invention to provide a rapid process simulator of the type stated which is capable of deriving simple linear models for characterizing a controllable process.

It is also an object of the present invention to provide a method of determining an analytical description and characterization of an existing process.

It is another salient object of the present invention to provide a rapid process simulator of the type stated which is portable in nature and capable of being transported to various locations for employment in a multitude of operating conditions.

With the above and other objects in view, our invention resides in the novel features of form, construction, arrangement and combination of parts presently described and pointed out in the claims.

In the accompanying drawings (nine sheets):

FIG. 2 is a schematic block diagram functionally showing the operative connection of the various component systems forming part of the rapid process simulator;

FIGS. 3a, 3b, 3c, 3d, 3e and 3f are a combined schematic wiring diagram showing in detail the component systems forming part of the rapid process simulator, of which:

Figure 3A:
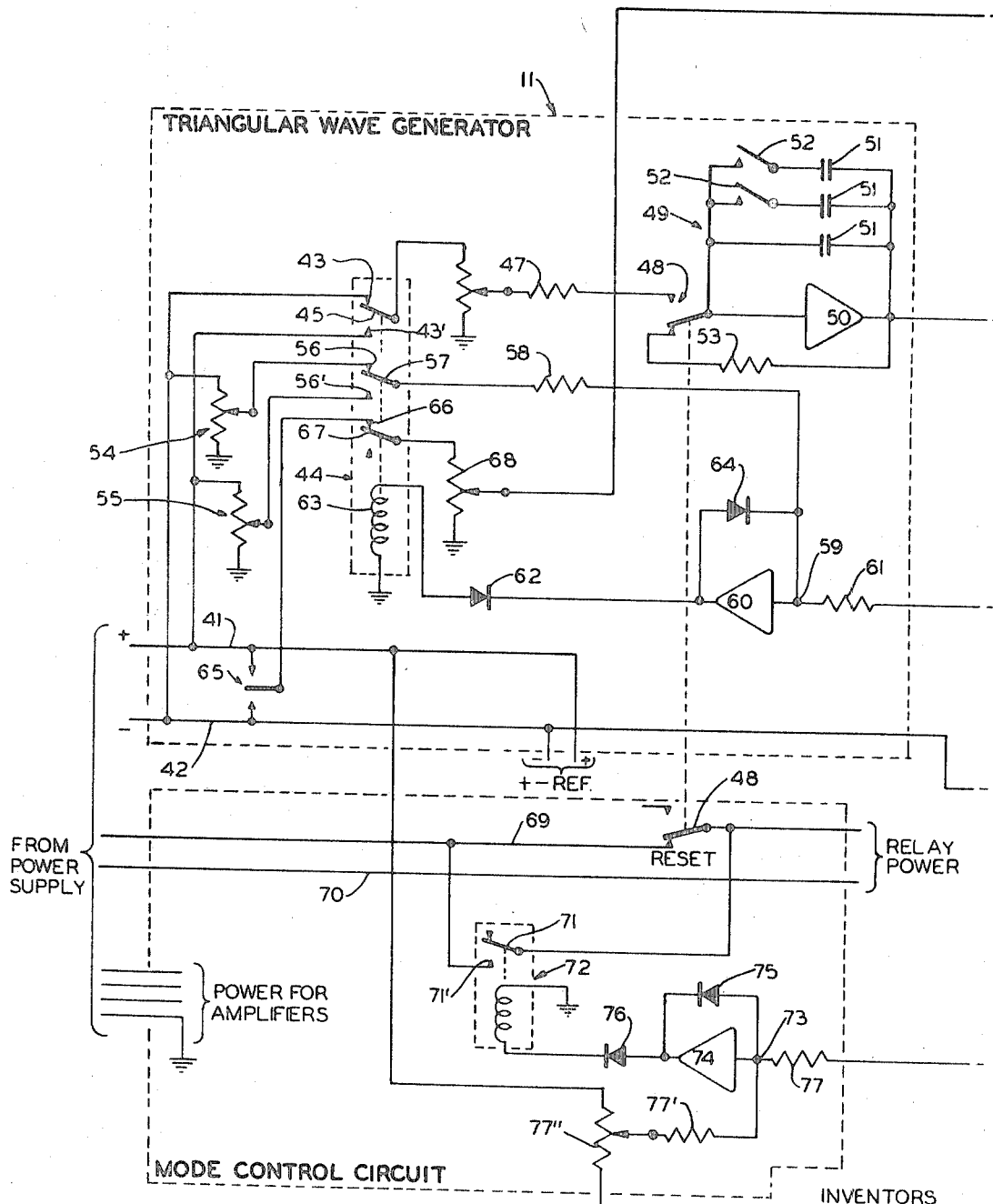
Figure 3B:
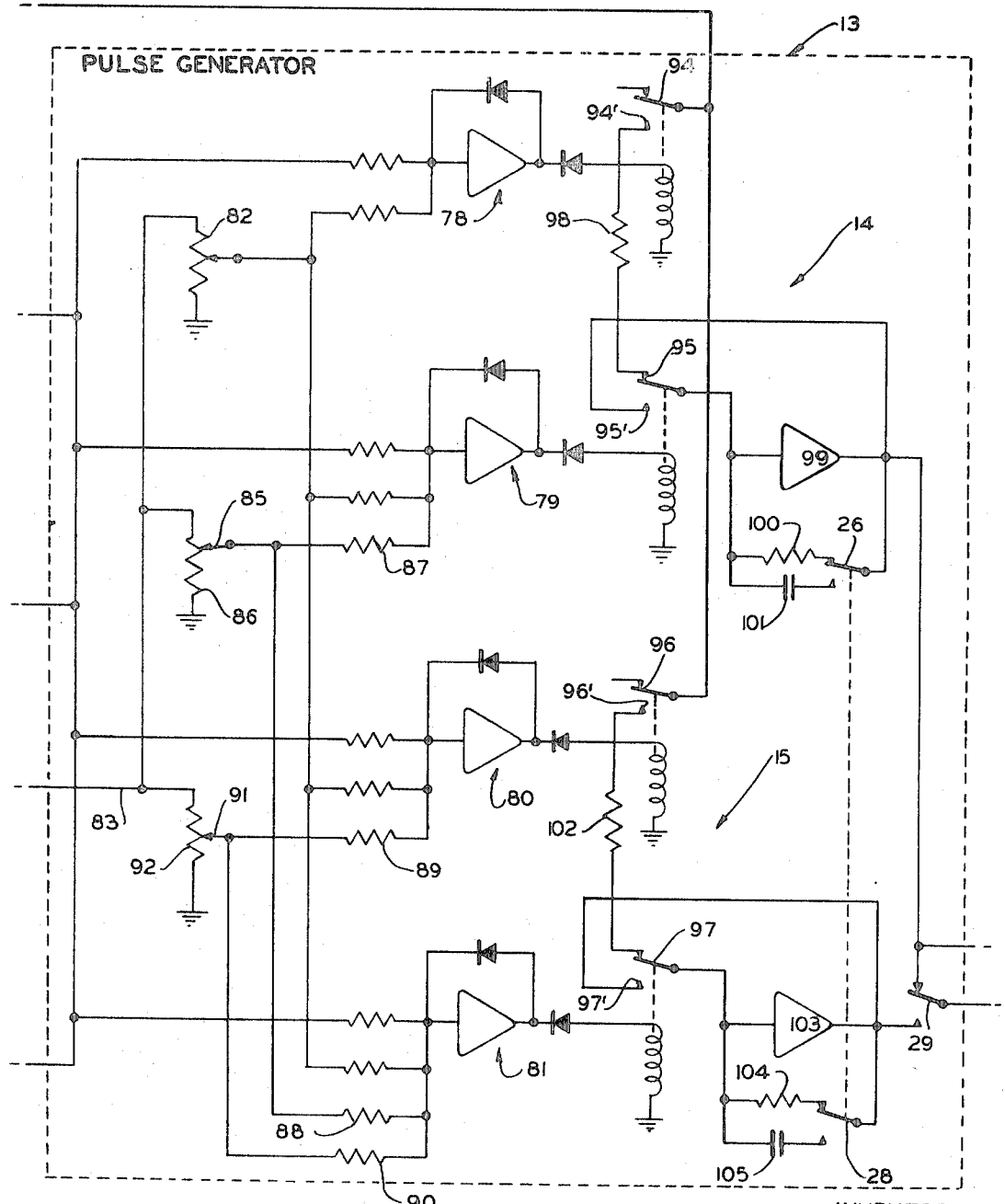
Figure 3C:
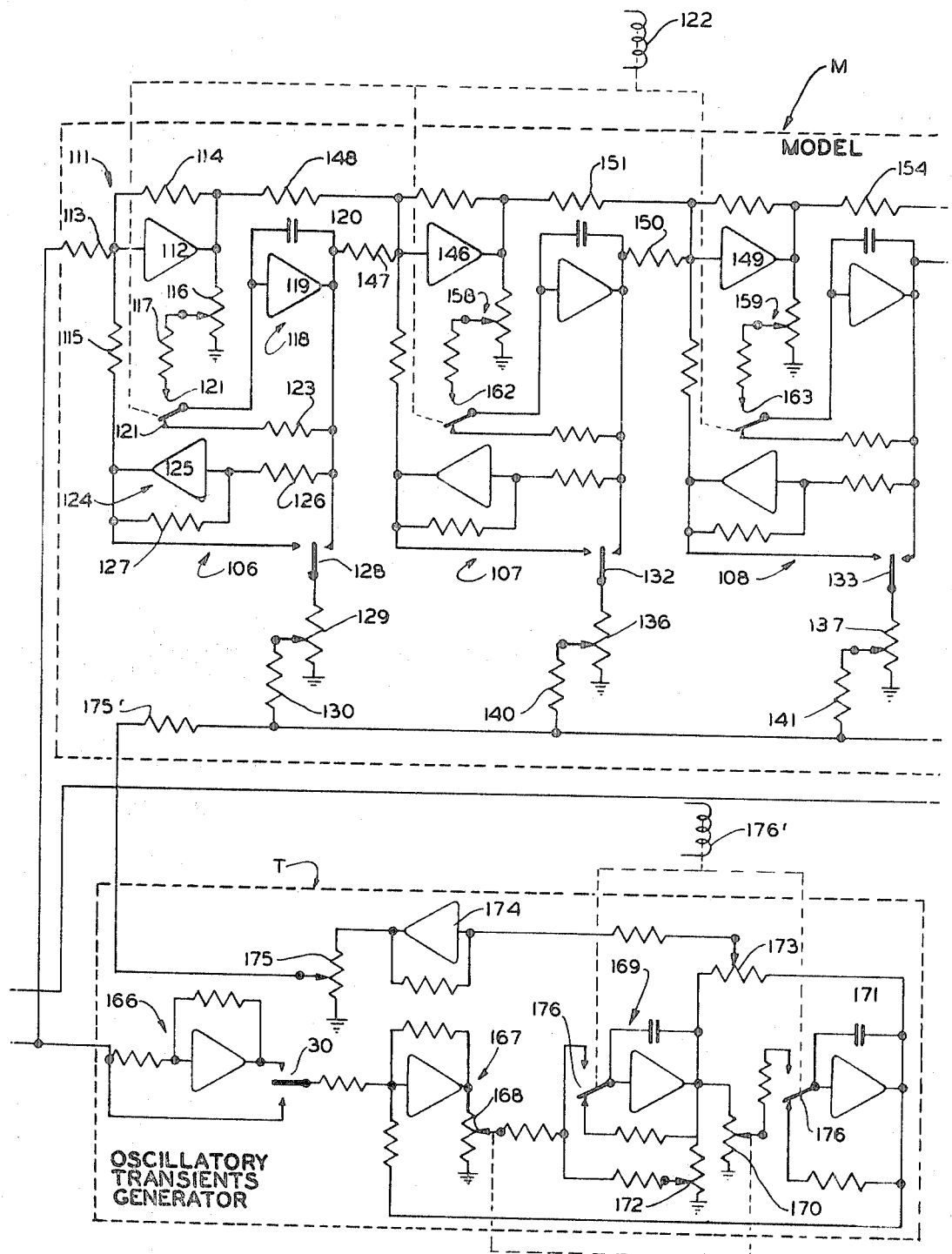
Figure 3D:
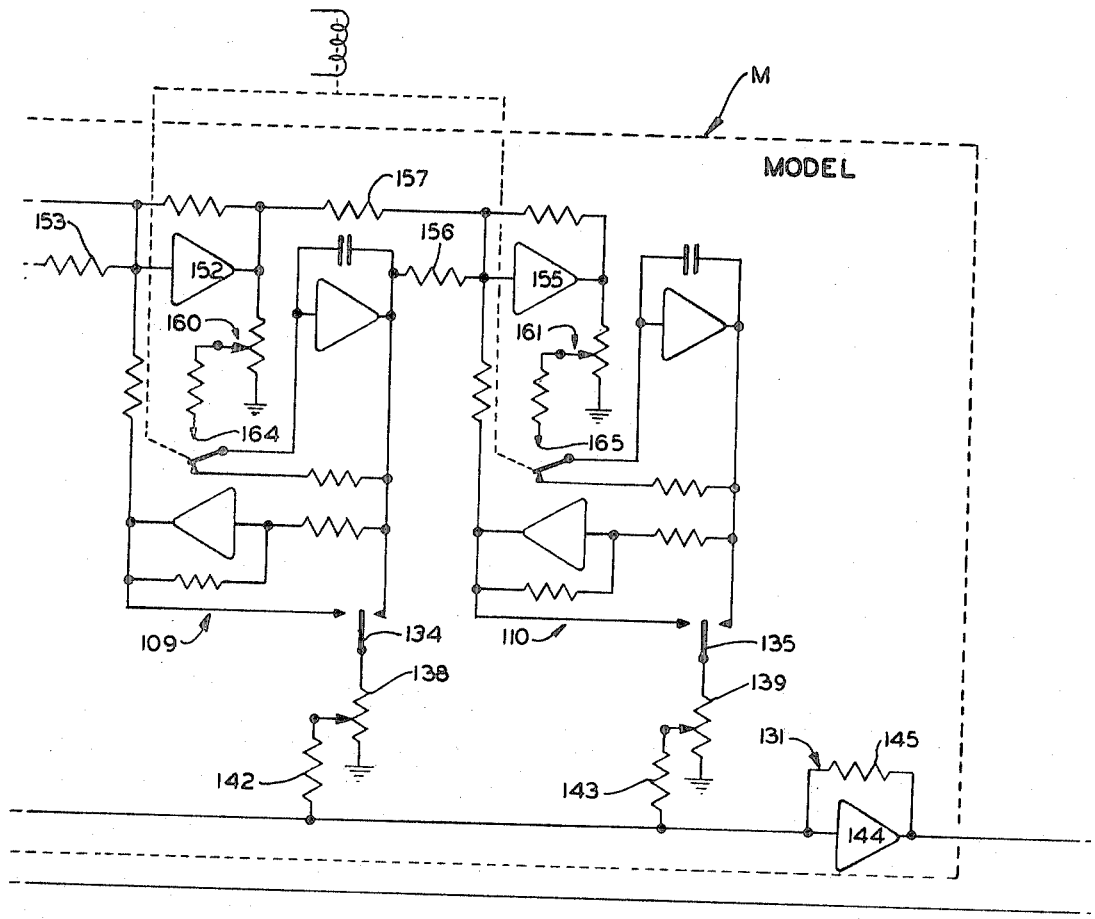
Figure 4:
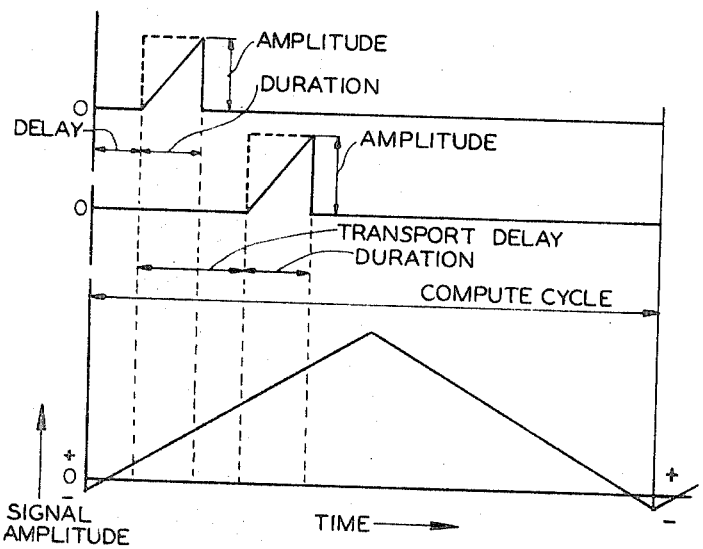
Figure 3E:
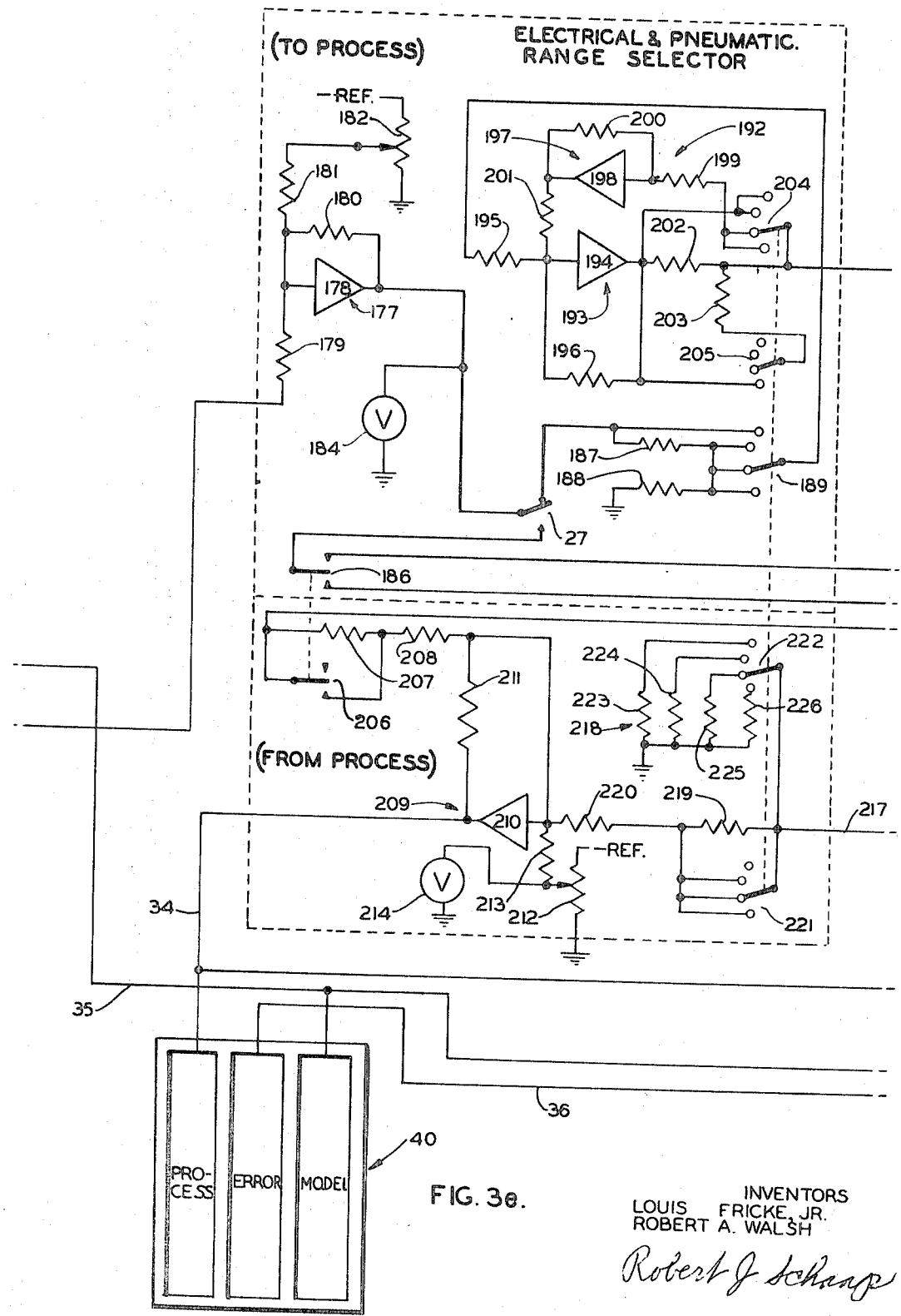
Figure 3F:
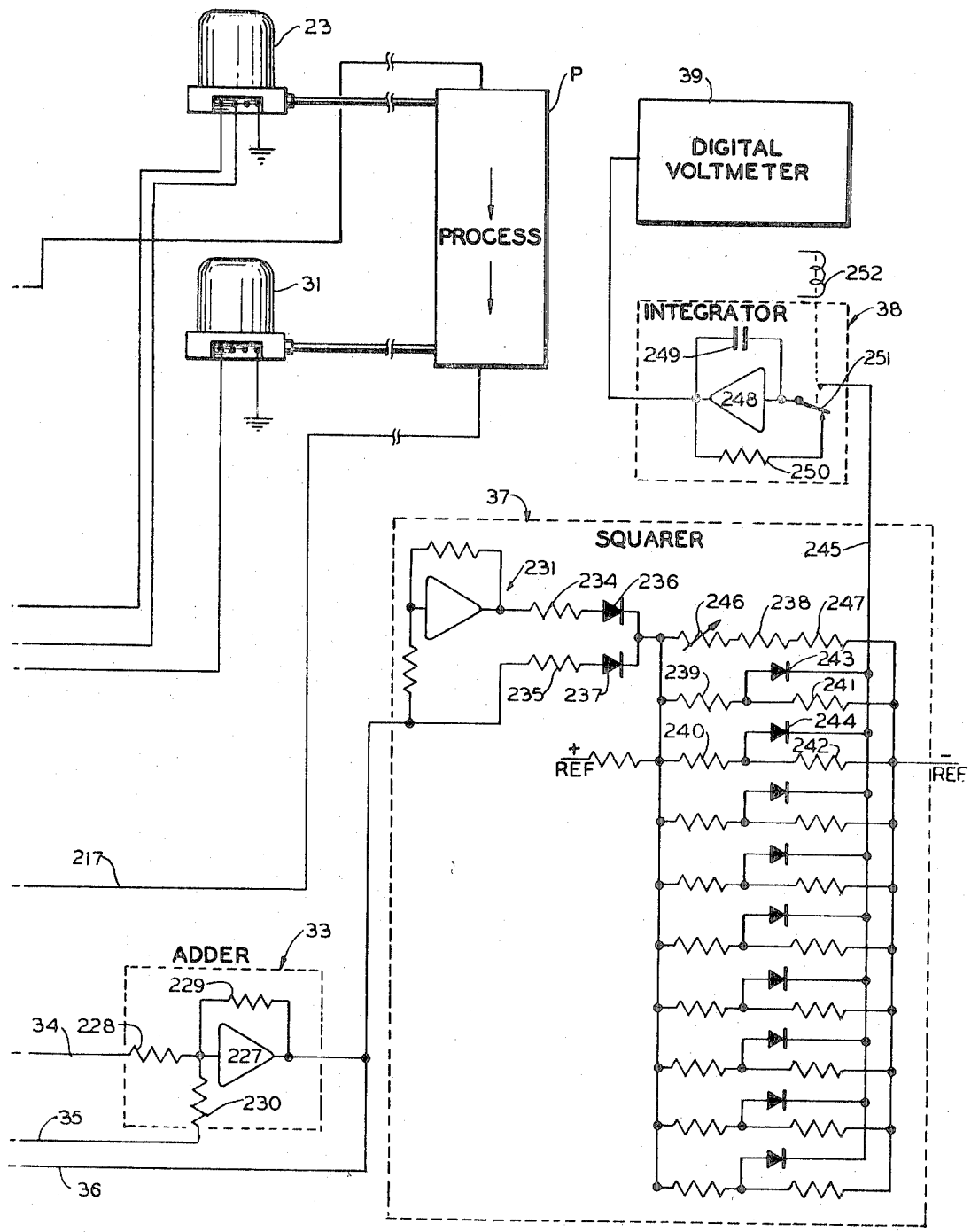

FIG. 3a schematically illustrates a triangular wave generator,

FIG. 3b schematically illustrates a pulse generator,

FIGS. 3c and 3d schematically illustrate a model of orthogonal functions,

FIG. 3c schematically illustrates an oscillatory transients generator,

FIG. 3e schematically illustrates an electrical and pneumatic range selector,

FIG. 3f schematically illustrates a summer, squarer, integrator, digital voltmeter and transducers;

FIG. 4 schematically illustrates the waveforms of the pulses produced by the triangular wave generator and pulse circuits with respect to time;

FIG. 5 is a schematic wiring diagram showing an operative connection of the rapid process simulator to an unknown process; and FIGS. 6a, 6b, 6c, 6d, and 6e illustrate the various waveforms produced in simulating the process of FIG. 5, wherein:

FIG. 6a represents the input waveform,

FIG. 6b represents the process output waveform,

FIG. 6c represents the model output waveform,

FIG. 6d represents the waveform on the output of the summer or the error signal, FIG. 6e represents the waveform of the integral of the error squared with respect to time.

GENERAL DESCRIPTION

The present invention relates to the use of noninteracting elements as a rapid method for determining process dynamics of a system. The rapid process simulator and the method of employment thereof is considered to be particularly adaptable for use with linear stable processes whose dynamic characteristics are unknown. The unknown process is generally compared with an orthogonal model. The model is formulated with the idea of choosing a pulse input in such a way to facilitate the construction of the system. The frequency analogs of the well-known Laguerre polynomials are particularly suitable as a choice for the simulator.

A five-term orthogonal set has been found to be sufficiently adequate as a model for the simulator. A disturbing pulse is injected into an open loop system of the process and into the developed model of the orthogonal functions. The responses produced by the open loop system of the process and the orthogonal model is then compared by subtracting the response of the orthogonal model from the response of the unknown process which produces an error signal. The error signal is then squared in a conventional squarer to produce the square of the signal and then integrated to obtain the integral of the error signal. The process can be repeated with new values of the coefficient until minimization of the integral error squared is obtained. This integral error squared can be conveniently depicted on a digital voltmeter. Moreover, the model and the integrator can be provided with reset pulses from the triangular and pulse wave generators which are used to provide the disturbing pulses. When the best fit is obtained by observing the time histories of both the unknown system and the model to the pulse input along with the value of the integral, the coefficients are read out and a simple expression is obtained for the input-output pair of interest.

In the past, sinusoidal waves have been used as a means of providing disturbing pulses. The sinusoidal wave as a means of providing a disturbing pulse is no longer employed, inasmuch as a triangular wave generator providing a signal to a square wave sampler and a ramp wave sampler will provide all of the harmonics necessary for the simulator. Accordingly, the rapid process simulator uses a triangular wave generator for developing pulses which are, in turn, transmitted to a pulse generator. The pulse generator employs a pair of off-on switching circuits, the first of which functionally serves as a square wave generator or so-called "sampler" or "shaper" and a ramp wave generator or so-called "sampler" or "shaper." The second off-on circuit functionally serves as a delay square wave sampler and delay ramp wave sampler for handling transport delay times, that is where the input pulse to the model is delayed so that the output of the unknown system and the model will begin at coincident times. While the pulse generator actually includes off-on switching circuits, these switching circuits can be functionally realized in the manner as described, and moreover each of the switching circuits is provided with pulse selectors for selecting a ramp wave or square wave as desired. Furthermore, each of the sets of square wave and ramp wave samplers is designed to provide signals to an electrical-pneumatic converter and range selector or pneumatic range selector. For example an electrical-to-pneumatic transducer can be employed for providing a pneumatic signal in the process or an electrical signal can be injected directly into the process and into the orthogonal model. Similarly, the output of the process can again be converted to an electrical signal for comparison with a model readout.

Once it has been established that the simple linear model is sufficiently accurate to describe the process, it is routine to determine the correct values of integral action, proportional action and derivative action on a standard process controller. Such methods as the root locus method and methods of Bode and Black, and Nyquist, etc. directly apply. Furthermore, the open loop adaptive control function can be determined by establishing a simple linear model for different levels of operation. Thus, the necessary controller characteristics for the entire set of model functions can be found as a function of these levels and with the application of these characteristics the process will always be operating at an optimum.

The chemical systems are almost always nonoscillatory, that is, the transfer function describing the dynamics are a series of time constants in the denominator with real roots. After a mathematical expression for the unknown process has been obtained through acquiring the coefficient of the parameter of the model, it is possible to formulate a procedure to obtain a slightly more damped closed loop response than the one-cycle, quarter-amplitude ratio or minimum area squared criteria. Stability apart, this is done by setting the transfer function of the closed loop system with unknown controller constants equal to unity and rewriting the expression in descending powers in the denominator and numerator. One then equates the coefficients of like powers and solves for the controller characteristics.

As used herein, the term "orthogonal" as applied to two unweighted transfer functions $f_1(x)$ and $f_2(x)$ generally in La Place form, between the limits of $-\infty$ and $+\infty$ is defined by a mathematical expression $$\int_{-\infty}^{+\infty} f_1(x)\overline{f_2(x)}dx = 0$$

In addition if $f_1(x)$ and $f_2(x)$ are orthonormal, the following relationship is true $$\int_{-\infty}^{+\infty} f_1(x)\overline{f_1(x)}dx = 1$$

In these expressions $\overline{f_1(x)}$ and $\overline{f_2(x)}$ are the conjugates of the real functions $f_1(x)$ and $f_2(x)$ respectively, and include real and imaginary components as $f_1(Rxjlx)$ and $f_{2(}Rxjlx)$.

When an orthogonal set of functions is normalized, by setting $$\hat{f}_1(x) = \frac{f_1(x)}{\int_{-\infty}^{+\infty} f_1(x)\overline{f_1(x)}dx}$$

and $$\hat{f}_2(x) = \frac{f_2(x)}{\int_{-\infty}^{+\infty} f_2(x)\overline{f_2(x)}dx}$$

it will satisfy the second equation where the integral of the functions of $x$ is equal to 1.

DETAILED DESCRIPTION

Figure 1:
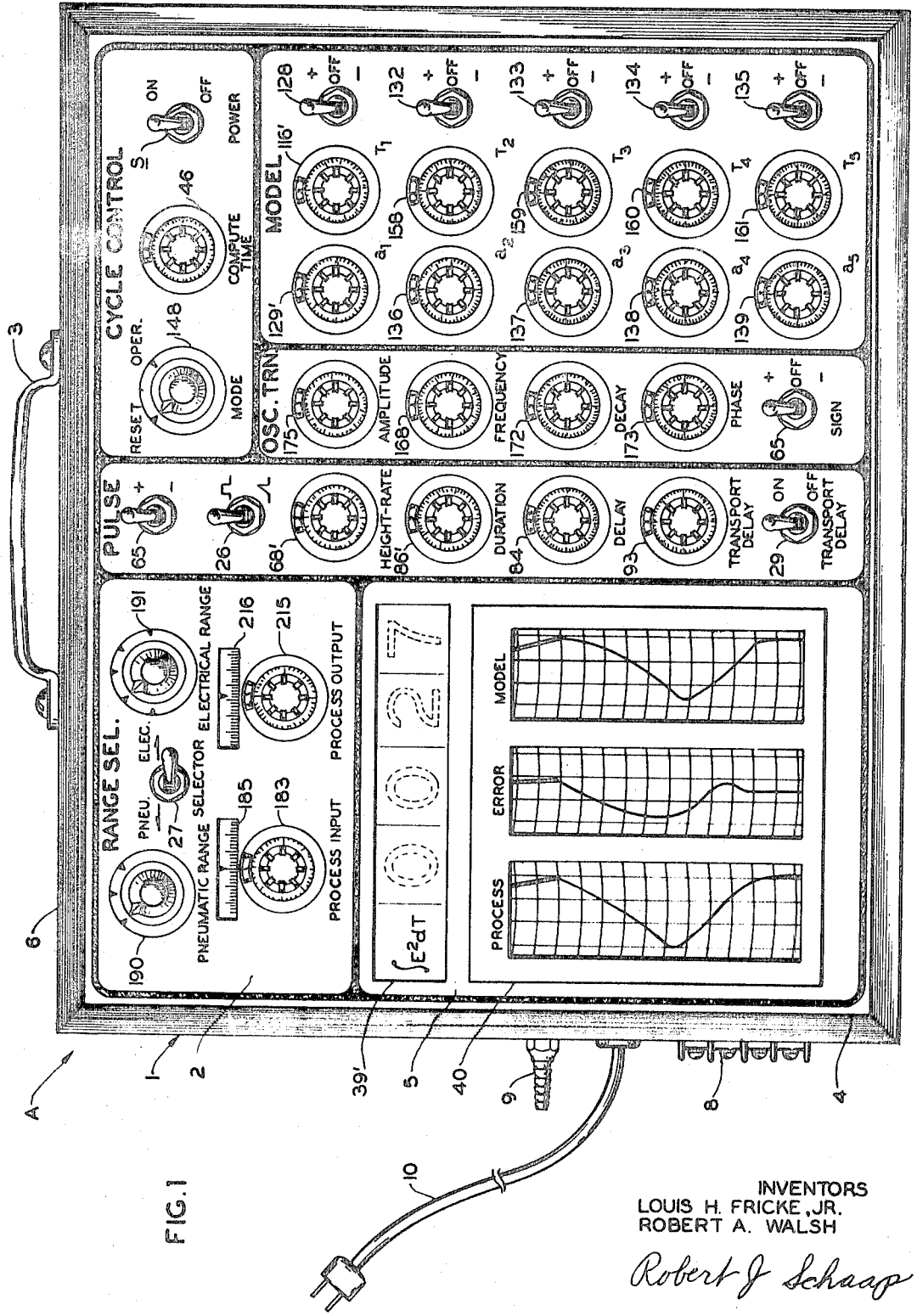
FIG. 1 is a front plan view of a rapid process simulator constructed in accordance with and embodying the present invention and showing in detail the control panel thereof.

Referring now in more detail and by reference characters to the drawings which illustrate a preferred embodiment of the present invention, A designates a rapid process simulator substantially as illustrated in its compact portable form in the front plan view of FIG. 1.

The rapid process simulator A can be designed as a rather small compact unit which is portable and easily transportable to various locations. Moreover, it can be designed so that it is capable of being fitted into any of the standard electrical component racks. As illustrated in FIG. 1, the rapid process simulator A is enclosed within a metallic cabinet 1 which is snugly fitted within a portable housing 2 having a handle-forming strap 3 on the upper end thereof. The housing 2 is centrally provided with a large rectangular aperture 4 on the front face for slidably accommodating the cabinet 1 of the rapid process simulator A. The outer housing 2 may be conventionally provided with tracks and rollers, as desired, for providing easy shifting movement of the cabinet 1 into and out of the portable housing 2. This construction is conventional and is, therefore, not described in detail herein.

The cabinet 1 of the rapid process simulator A forms a control panel 5 upon which are mounted a series of dials, switches and recorders, to be hereinafter described in more detail. The control panel 5 is slightly recessed and extending around the periphery thereof on the cabinet 4 is a peripheral rim 6. A series of spaced conventional lock mechanisms (not shown) may be mounted on the front face of the housing and which engage the rim 6 on the cabinet 1. These conventional lock mechanisms may be swingable from the locked position so that the cabinet 1 may be removed from the housing 2. Mounted on a side panel of the housing 2 is a pair of multistation terminal connectors 8 and a pair of pneumatic fittings 9. Similarly extending from the rear wall of the housing 2 is a cord set 10 for connection to a suitable source of electrical current (not shown).

Schematic Block Diagram

FIG. 2 provides a schematic illustration in block diagram of the operative connection between the various component systems forming part of the rapid process simulator and its operative connection to the process with unknown conditions. The rapid process simulator A includes a regulated power supply S which supplies power for all circuits in all blocks of the instrument. A main off-on power switch *s* as illustrated in FIG. 1, is internally wired in this unit and mounted on the control panel 5. The simulator A also includes a triangular wave generator 11 for producing pulses to be injected into an unknown process P having unknown parameters and into a model of orthogonal functions M. The triangular wave generator 11 also includes a compute time mechanism 12 for adjusting the time period of the simulation. The triangular wave generator 11 provides the time controlling signal which is transmitted to a pulse generator 13, as illustrated in FIGS. 2 and 3*a*. By reference to FIG. 3*b*, it can be seen that the pulse generator 13 includes a pair of off-on bistable switching circuits 14,15 which are more fully described in detail hereinafter. However, in the block diagram of FIG. 2, the pulse generator 13 is illustrated as including a square wave generator or so-called "sampler" 16 and a ramp wave generator or so-called "sampler" 17. The pulse generator 13 is also illustrated as including a delay ramp wave generator or sampler 18 and a delay square wave generator or sampler 19. In terms of circuitry involved, the samplers 16 and 17 are included in the switching circuit 15. The triangular wave generator 11 is illustrated as including four samplers for ease of explanation of the invention since in functional form the generator 11 operates as though it included four samplers or wave generators. The triangular wave generator 11 produces a triangular wave which is fed to the samplers 16, 17, 18 and 19, all in the manner as schematically illustrated in FIG. 2. The output of the triangular wave is always positive except for a short period when it is negative at the end of the compute cycle for resetting.

The square wave sampler 16 and the ramp wave sampler 17 are provided with electrical output lines 20,21 respectively which can be connected to an electrical range selector 22 for converting the signal into a desired electrical input range. The output lines 20,21 may also be connected to an electrical-to-process converter 23 which is capable of changing the electrical output into a desired process input. The process input, of course, may be a pneumatic input or electromechanical input and the converter 23 is designed to convert the electrical input thereof to the desired process input. As illustrated in FIG. 2, the electrical-to-process converter 23 or so-called "E-P converter," is a conventional electropneumatic transducer capable of converting electrical signals into proportional pneumatic signals. Furthermore by reference to FIG. 3*f*, it can be seen that the electrical-to-process converter 23 and the electrical range selector 22 are constructed with common circuitry and form a unitary electrical and pneumatic range selector. However, the electrical and pneumatic range selector is illustrated with the range selector 22 and converter 23 in block form in FIG. 2 since the selector serves both functions. This input signal which may be either in pneumatic or electrical form is thereupon inserted into the process P in order to disturb the condition of the process. The signal is also inserted into the model M of orthogonal functions. However, it may be desirable to provide a delayed model signal in certain cases. Accordingly, the delay square wave sampler 18 and the delay ramp wave sampler 19 are provided with outputs 24,25 which are, in turn, optionally connected to the input of the model M for providing a signal to the model M of orthogonal functions.

A two-way sampler switch 26 is connected across the output lines 20,21 for selection of either a square wave signal or a ramp wave signal. The switch 26 is mounted on the control panel 5 in the manner as illustrated in FIG. 1. The switch 26 is, in turn, electrically connected to a switch 27 which serves as an electrical-pneumatic selection switch, the latter also being mounted on the control panel 5. By reference to FIG. 2, it can be seen that the switch 26 functionally provides selection between the square wave sampler 16 and the ramp wave sampler 17. The selector switch 27 provides selection between the electrical range selector 22 and the process-range converter 23 for providing a desired pulse. The output lines 24,25 are also provided with a sampler selection switch 28 similar to the previously described switch 26 for selecting either a delay square wave or a delay ramp wave from the samplers 18,19 respectively. The switch 28 is mechanically connected to and operable with the switch 26 and is, therefore, not mounted on the control panel. In other words, when the square wave sampler 16 is functionally employed, the delay square wave sampler 18 may be functionally employed, Similarly, when the ramp wave sampler 17 is functionally employed, the delay ramp wave sampler 19 may be employed. A two-way switch 29 is mounted on the control panel 5 and is designed to functionally interpose the delay samplers 18,19 in the circuit by providing a delayed pulse to the model M as illustrated in FIG. 2. It may be desirable to provide an oscillatory transient on the signal in the model function M if the process P contained such transients and therefore, an oscillatory transients generator T is provided. The oscillatory transients generator T is connected to the model of orthogonal functions M and into the input line to the model M. A switch 30, which is mounted on the control panel 5 provides optional interposition of the oscillatory transients generator T in the system in the manner as schematically illustrated in FIG. 2.

The input signals are designed to upset the process and, thereby, produce a process output signal which is, in turn, transmitted to a process to electrical signal converter 31 or so-called "P-E converter." This converter is similar to the converter 23 and may be a conventional pressure transducer. If the process P is electrical in nature and the output thereof is electrical, the output signal is transmitted directly to an electrical range selector converter 32 substantially similar to the previously described selector 22. The electrical range converter 32 and the process-to-electrical signal converter 31 are functionally illustrated in the block diagram of FIG. 2 as separate components for purposes of more fully describing the present invention. However, it can be seen that these two components are partially combined to form an electrical and pneumatic range selector as illustrated in FIG. 3*e*. It should also be noted that a selector switch is not employed for the output signals from the process since only an electrical or a pneumatic signal may be transmitted therefrom.

The combined pneumatic and electric signal converter 31 transmits the output signal to one terminal of an adder or summer or so-called "totalizer" 33 and the output signal of the model M is transmitted to the other terminal of the totalizer 33. An output tap 34 from the process-to-electrical converter 31 and an output tap 34' from the range selector converter 32 are connected to opposite terminals of an electrical-pneumatic selector switch 27'. Accordingly, it is possible to select the proper signal from the process P for transmission to the adder 33. It should be recognized that the switches 27,27' are not connected in common since it is possible to introduce an input signal which differs in kind from the output signal of the process. An output tap 35 on the output side of the model M will provide the output signal of the model M. The adder 33 is designed to combine the output signal of the model M of the orthogonal functions with the process signal and, thereby provide an error signal which can be tapped at 36 for optical illustration thereof. The error signal from the adder 33 is transmitted to a conventional squarer 37 in order to obtain the square of the error signal with respect to time. The signal from the squarer 37 is then transmitted to a conventional integrator 38 often referred to as an "evaluation means" where the square of the error signal is integrated with respect to time and, in turn, is transmitted to a four-place digital voltmeter 39. The voltmeter 39 is provided with a four-digit readout panel 39' mounted on the control panel 5, for direct reading output. The signal from the process P at the taps 34,34', the output signal from the model M at the tap 35 and the error signal at the tap 36 can be graphically illustrated on a three channel oscillographic recorder 40 or so-called "recording oscillograph" as illustrated in FIG. 1. This recorder is conventional in its construction and is, therefore, not described in further detail herein. The integrator 38 which is conventional in its construction is also electrically connected to the triangular wave generator 13 for receiving reset pulses. The digital voltmeter 39, which is also conventional in its construction is normally operating at its own repetition rate and, therefore, a number of readings are monitored during one compute cycle. After the output of the error signal, which has been integrated, is depicted on the digital voltmeter 39, the triangular wave generator 11 is designed to provide reset pulses to the integrator 38, the model M and the oscillatory transients generator T for resetting each of these components to a zero position.

Thus, in the operation of the system, the unknown process which is to be analyzed is selected. This process may be pneumatic, electrical, mechanical, biological, etc., the only criterion being that the process must be capable of providing an electrical or pneumatic output signal and accepting an electrical or pneumatic input signal. The compute time mechanism 12 is set to a desired time period before pulses are injected into the process and into the model of orthogonal functions. This time compute mechanism 12 controls the frequency of the triangular wave generator 11 which in turn provides a triangular wave signal to each of the square wave samplers 16,18 and to each of the ramp wave samplers 17,19. If for the type of process being simulated, it is desirable to employ a square wave, the switch 26 is shifted to the position where it communicates with the square wave sampler outlet line 20. If it is desired to employ a delayed ramp or square wave for the model M, the switch 29 may be shifted to the position where the transport delay samplers 18,19 are interposed in the circuit. On the other hand, if the system is such that a delayed wave to the model is not necessary, the switch 29 is switched to the off position so that the transport delay samplers 18,19 are inoperable, that is the off-on switching circuit 15 is rendered ineffective through the switch 29. After the selection between the square wave and ramp wave samplers, the switch 27 is shifted to the converter 23 or the range selector 22. The converter 23 is employed if the signal is one other than an electrical signal. However, if the input signal is an electrical signal, the range selector 22 would be employed. If an input signal is transmitted to the process and by inspection of the recorder, the process output is found to contain oscillatory transients, the oscillatory transients generator T may be interposed in the system by closing the switch 30, that is shifting the switch 30 to either "plus" or "minus" position.

The responses produced by the open loop system of this process P and the orthogonal model M is compared by subtracting the response of the orthogonal model M from the response of the process P at the summer 33, which in turn produces an error signal at 36. The signal from the process can be tapped at 34,34' and the signal from the model can be tapped at 35. If the signal from the process P is other than an electrical signal, it is converted to an electrical signal in the P-E converter 31. The error signal on the output of the adder 33 is then transmitted to the squarer 37 where it is squared. The integral of the error squared is then obtained in the integrator 38 and this error squared signal is transferred to the digital voltmeter 39 where an output reading is obtained. By observing the time histories of both the unknown process P and the model M, the coefficients of the parameters of the model with respect to time are obtained and at the smallest error signal, a simple expression is obtained for the input-output pair of interest.

Having described the overall operation of the various component systems, it is possible to describe each of the component systems in detail.

Triangular Wave Generator

The first component system in the triangular wave generator which is schematically illustrated in FIG. 3a. The triangular wave generator 11 is connected to the power supply S and receives therefrom a plus reference signal and a minus reference signal by means of reference signal conductors 41,42 respectively. The conductors 41,42 are connected across contacts 43,43' of a relay 44. Movable between the contacts 43,43' is a contact arm 45 which is connected directly to the compute time control mechanism 12. A standard potentiometer 46 forms part of the compute time control mechanism 12 and a control dial 46' is mechanically connected thereto and mounted on the control panel 5 for operation of the same. The movable arm of the potentiometer 46 which forms part of the compute time control mechanism 12 is connected through an integrator input resistor 47 to a reset-operate switch or so-called "mode control" switch 48 forming part of a Miller Integrator 49. The Miller Integrator 49 includes an operational amplifier 50 and connected in parallel therewith is a series of integrating capacitors 51. A series of time scale switches 52 are also connected in parallel therewith and are designed to control the integration rate of the integrator 49. A reset resistor 53 is also connected in parallel to the amplifier 50 and is connected to one terminal of the reset-operate switch 48 for the purpose of resetting the integrator 49 to zero. The reset-operate switch 48 is actually a mode control and is mounted on the control panel 5 in the manner as shown in FIG. 1. In order to make time scale changes and get proper input and output characteristics, the reset-operate switch 48 is set to the reset position, that is the lower position, reference being made to FIG. 3a. When shifted to the "operate" position, that is the upper position, reference being made to FIG. 3a, the integrator and associated circuitry hereinafter described will continually provide triangular wave signals.

Also connected across the plus and minus reference conductors 41,42 are a pair of voltage dividing variable resistors 54,55, the movable arms of which are connected to contacts 56,56', respectively. A contact arm 57 movable between the contacts 56,56' is connected through an input resistor 58 to a summing junction 59 of an operational amplifier 60. An input resistor 61 is located on the opposite side of the summing junction 59 with respect to the amplifier 60. In effect, a comparison of voltage across the input resistors 58,61 is made with the summing junction 59. The voltage sum is amplified by the amplifier 60 and if the sign is correct, the signal is passed through a diode 62 to a relay coil 63 forming part of the relay 44. If the sign is not correct, the voltage will not pass through the diode 62 but is shunted to the summing junction 59 through a diode 64 connected in parallel with the amplifier 60.

A three-position pulse direction switch 65 having a plus position, a minus position and an off position is connected across the reference conductors 41,42. The switch 65 is mounted on the control panel 5 and the movable element thereof is connected to a contact 66 which is cooperative with a movable contact arm 67, the latter being connected to a height/rate potentiometer 68. A height/rate control dial 69 is mechanically connected to the potentiometer 68 for operating the same and is mounted on the control panel 5.

When the main power switch s is closed, the reference conductors 41,42 will become energized. The contacts 43,43' and 56,56' will also become energized. If the pulse direction switch 65 is moved to the positive position, the contact 66 is energized. The deenergized position of the relay 44 is illustrated in FIG. 3a. If the reset-operate switch 48 is in the operate position, the integrator 49 will produce a positively increasing output signal. This voltage is compared by the input resistors 58,61 to the voltage on the variable resistor 54. When the output voltage on the integrator 49 reaches a value slightly more positive than the negative value on the variable resistor 54, then the sign of the amplifier 60 is negative allowing current to pass through the diode 62 and thus energizing the coil 63 of the relay 44. Energization of the coil 63 will cause the contact arms 45,57 to shift to the contacts 43',56' respectively. This changes the value of the input to the integrator 49 changing the sense thereof so that it becomes increasingly negative. The output voltage of the integrator 49 becomes increasingly negative until the voltage compared at the summing junction 59 is slightly negative causing the output of the amplifier to be positive. Since the diode 62 will not accept positive voltages, this causes the coil 63 to become deenergized. As a result thereof, the contact arms 45,57 and 67 will shift to their upper position, reference being made to FIG. 3a. The diode 64 is connected so that the amplifier 60 receives negative feedback when the output thereof attempts to become positive. The presence of the contacts 66 insures that a pulse will only be generated when the output of the integrator 49 is increasing positively. By reference to FIG. 3a, it can be seen that the relay coil 63, the diodes 62,64, the amplifier 60 and the input resistors 58,61 form a relay comparator circuit which is present in many other component systems of the present invention. This relay comparator circuit is similar to the relay comparator circuit used in the other systems and is, therefore, not described in detail hereinafter. However, it should be recognized that more input resistors can be employed for comparing more than two circuits.

Mode Control Circuit

Many reset relay circuits are present in the component systems forming part of the rapid process simulator such as the model M, the oscillatory transients generator T and the integrator 38. A mode control circuit, substantially as illustrated in FIG. 3a, is provided for resetting each of these component systems to initial conditions after each compute cycle. The mode control circuit includes a pair of low voltage relay power conductors 69,70. This relay power is supplied to the various relay coils by means of closing the manual reset-operate switch 48 or automatically at the end of the compute cycle by means of contacts 71,71' forming part of a relay 72. The relay 72 is energized by a relay comparator circuit 73 similar to the relay comparator circuit in the triangular wave generator 11. When the triangular wave becomes slightly negative, the relay 72 will become energized causing the contacts 71' to close and this, in turn, will energize all other reset relay coils in all component systems, thereby resetting the associated component systems. The operative connection to the other component systems of the mode control circuit will be more fully hereinafter described in detail.

A typical relay comparator circuit as employed in the present invention is illustrated in FIG. 3a and includes a relay coil such as the coil 72 which operates a set of contacts similar to the contacts 71,71'. The typical relay comparator circuit, therefore, includes the relay coil 72, an operational amplifier 74, a pair of diodes 75,76, and at least two input resistors 77,77'. The diode 75 is connected in parallel with the operational amplifier 74 and the diode 76 is connected in series with the amplifier 74 and the relay coil 72. In its operation, the amplifier 74 will amplify a difference signal measured by the input resistors 77,77'. If the difference signal is of the proper polarity, the diode 76 will conduct, thereby energizing the coil 72. If the difference signal is of an undesired polarity, the diode 76 will not conduct and the diode 75 will conduct thereby maintaining a low output from the amplifier 74 preventing energization of the relay 72. Connected to the resistor 77' is an internally disposed reference potentiometer 77" for providing a slightly positive voltage so that the relay 72 will be energized when the triangular wave is slightly negative. By means of this circuit, it is possible to compare a selected fixed or variable voltage to a reference voltage and performing either of two functions depending upon the difference in the magnitude of these two voltages.

Pulse Generator

The functional operation of the pulse generator 13 is more fully illustrated in FIG. 2 and the operation thereof in terms of function is described hereinabove. The components forming part of the pulse generator are more fully illustrated in FIG. 3b and include four relay comparator circuits 78, 79, 80 and 81. Each of these relay comparator circuits 78, 79, 80 and 81 is substantially similar to the relay comparator circuit 73. These relay comparator circuits are also substantially similar to the comparator circuit in the triangular wave generator 11 except that the relays are energized on a positive signal whereas the relay in the comparator circuit of the triangular wave generator was energized on a negative signal.

The input of each of the relay comparator circuits 78, 79, 80 and 81 is connected in common to the output of the integrator 49. Moreover, another input of each of the relay comparator circuits 78, 79, 80 and 81 is connected to the movable element of a delay control potentiometer 82. One terminal of the delay control potentiometer 82 is connected to a minus reference conductor 83 which in turn receives power from the power supply S. The opposite terminal of the potentiometer 82 is grounded. The delay control potentiometer 82 is operable by a delay control dial 84 mounted on the control panel 5 and is designed to provide a delay in the time that the first disturbing pulse commences after the operate switch is shifted to the "operate" position.

The relay comparator circuits 79,81 have additional input resistors 87,88 which are connected in common and to the movable arm 85 of a duration control potentiometer 86. One terminal of the duration control potentiometer 86 is connected to the negative reference conductor 83 and the opposite terminal thereof is grounded. The movable arm 85 of the duration control potentiometer 86 is mechanically connected to and operably by a duration control dial 86', the latter being mounted on the control panel 5. The duration control potentiometer 86 is designed to provide any desired pulse widths for both square and ramp wave pulses and associated delayed square and ramp wave pulses. The relay comparator circuits 80,81 and additional input resistors 89,90 respectively, are connected in common to the movable arm 91 of a transport delay control potentiometer 92. The movable arm 91 of the potentiometer 92 is mechanically connected to and operable by a transport delay control dial 93, which is mounted on the control panel 5. The transport delay control potentiometer 92 is designed to control the time delay between the initiation of a disturbing pulse to the model M after the injection of a disturbing pulse into the process P. The relationship between the disturbing pulse transmitted to the process P and the pulse transmitted to the model M for comparison is more fully illustrated in FIG. 2.

The relay comparator 78 includes a set of normally open contacts 94,94' and the relay comparator 79 includes a pair of normally closed contacts 95 and a normally open contact 95'. Similarly, the relay comparator circuit 80 includes a pair of normally closed contacts 96 and a normally open contact 96' and the relay comparator circuit 91 includes a pair of normally closed contacts 97 and a normally open contact 97'. The normally open contact 94' is connected through an input resistor 98, through the normally closed contact 95, and to the input of a medium gain operational amplifier 99. The movable arm of the selector switch 26 is connected to the output side of the amplifier 99 and to the normally open contact 95'. Connected to the input side of the amplifier 99 is a feedback resistor 100 and also connected in parallel with the amplifier 99 is a feedback capacitor 101. Thus, when the sampler switch 26 is shifted to the upper position, the feedback resistor 100 is inserted in the circuit and the amplifier 99 operates as an inverter. When the switch 26 is shifted to the lower position, the capacitor 101 is inserted in the circuit and the amplifier 99 operates as an integrator. The operational amplifier 99, the feedback resistor 100 and the capacitor 101, in combination with the selector switch 26 constitutes a pulse selector.

A similar pulse selector is connected to the relay comparator circuits 80,81. The contact 96' is connected through an input resistor 102, through the normally closed contact 97 to the input of a medium gain operational amplifier 103. The selector switch 28 is connected to the output of the amplifier 103 and to the normally open contact 97'. Connected to the input of the amplifier 103 is a feedback resistor 104 and a feedback capacitor 105. As previously indicated, the switches 26,28 are "ganged" or connected in common, so that they operate in unison. Thus when the switch 26 is shifted to the upper position, the switch 28 will be shifted to the upper position and the amplifiers 99,103 will both function as inverters. Similarly, when the switch 26 is shifted to the lower position, the switch 28 will be shifted to the lower position, reference being made to FIG. 3b and the amplifiers 99,103 will serve as integrators. By further reference to FIG. 3b, it can be seen that the output of the operational amplifiers 99,103 is connected to the transport delay switch 29.

It can be seen that the relay comparator circuits 78,79 combined with the associated pulse selector circuit forms the square wave and ramp wave selectors 16,17. Similarly, the relay comparator circuits 80,81 and the associated pulse selector circuit form the delay square wave and delay ramp wave selectors. In its operation, the triangular wave will increase positively in slope to a point where it equals the value set on the delay control potentiometer 82 at which time the contact 94 closes, thereby feeding a voltage from the height/rate potentiometer 68 to the input resistor 98. Since the contacts 95 are closed at this time, this signal will be transmitted to the amplifier 99. In similar manner, when the positively increasing triangular wave voltage equals the combined voltages maintained on the delay control potentiometer and the duration potentiometer 85 the contact 95' will close. This will remove the input to the amplifier 99 and resets the amplifier 99 to a zero position. During the time that the triangular wave is increasing positively, a constant amplitude signal is transmitted to the relay comparator circuits 78,80 from the height/rate control potentiometer 68. Thus, by the continued switching of the on-off switching circuit 14, the adjusted constant amplitude signal to the relay comparator circuit 78 will produce a square wave when the selector switch 26 is shifted to the "square wave" position, that is the upper position. In this manner, the amplifier 99 serves as a coupler. When the switch 26 is shifted to the lower position, that is the "ramp wave" position, the amplifier 99 will serve as an integrator-coupler and the constant amplitude signal supplied to the relay comparator circuit 78 will form a ramp wave when integrated.

The off-on switching circuit 15 operates in similar manner to the off-on switching circuit 14. More specifically, the relay comparator circuits 80,81 operate in a manner similar to the operation of the relay circuits 78,79. When the voltage at the contact 96 is equal to the combined voltage at the delay control potentiometer 82 and the transport delay control potentiometer 92, the contact 96' will close. The same signal fed to the contact 94' is fed to the contact 96' and the input resistor 102. This signal is transmitted to the amplifier 103. Therefore when the selector switch 28 is shifted to the upper position, the amplifier 103 serves as an inverter and a square wave signal is produced. When the selector switch 28 is shifted to the lower position, the amplifier 103 serves as an integrator and a ramp wave signal is produced. However, the signal output of the amplifier 103 is delayed more than with respect to the amplifier 99. This occurs as a result of the interposition of the resistors 89,90 in the circuit, thereby causing the relay comparator circuits 80,81 to operate on a higher voltage of the triangular wave signal.

From the above analysis, it can be seen that by increasing the voltage on the delay control potentiometer 82, a higher voltage is required at the other input of the comparator circuit 78 to cause the contact 94' to close. This will create a greater delay in the time that the square wave commences. In similar manner, an increase of voltage in the duration control potentiometer 86 will require a greater voltage on the triangular wave input to the relay comparator circuit 79 before the same will switch. Also, an increase in voltage on the transport delay potentiometer 92 will necessitate a larger voltage on the triangular wave input to the relay comparator circuits 80,81 before the same will switch. In this manner, it is possible to control the delay and duration of the initial square wave or ramp wave signal and to control the delay, duration and transport time of the second square or ramp wave signal. By shifting the switch 29 to the lower position, that is the "on" position, the transport delay square and ramp wave selectors 18,19 are inserted in the circuit. By shifting the switch 29 to the upper position, that is the "off" position, no transport delay is created and square or ramp wave signals will be fed simultaneously to the model M, the oscillatory transients generator T and the process P.

Model

The model is designed to match an unknown process in order to determine the parameters of the dynamic characteristics of the process. In the rapid process simulator A, the following mathematical representation of the model has been found to be adequate for the vast number of mechanical, electrical, and electromechanical processes encountered.

$$\frac{\text{Output}}{\text{Input}}(s) = \frac{a_1}{T_1s+1} \pm \frac{a_2(1-T_1s)}{(T_1s+1)(T_2s+1)}$$
$$\pm \frac{a_3(1-T_1s)(1-T_2s)}{(T_1s+1)(T_2s+1)(T_3s+1)}$$
$$\pm \frac{a_4(1-T_1s)(1-T_2s)(1-T_3s)}{(T_1s+1)(T_2s+1)(T_3s+1)(T_4s+1)}$$
$$\pm \frac{a_5(1-T_1s)(1-T_2s)(1-T_3s)(1-T_4s)}{(T_1s+1)(T_2s+1)(T_3s+1)(T_4s+1)(T_5s+1)}$$

It can be seen that the mathematical expression of the model includes parameters in a fifth order system of which five are amplitude coefficients and five are time constants. The mathematical theory for the derivation of the circuit requirements to be the analog of this expression is set forth hereinafter. However, it should be recognized that a higher order system could be employed in some cases where it is necessary to obtain a more accurate simulation of the system. It should also be recognized that the model herein described is orthogonal to a unit input function. For any other practical input pulses, the degree of orthogonality is reduced slightly. This reduction in orthogonality by employment of other than unit input pulses has produced no problem and the model set forth above has been found to be adequate. If it is desired to use a greater degree of mathematical rigor, it is possible to adjust the model within the scope of this invention by altering the present model and testing the alteration thereof mathematically for orthogonality. The method of altering the model will be more fully understood by reference to the mathematical theory of operation of the rapid process simulator hereinafter set forth.

The present model includes five amplitude constants $a_1$, $a_2$, $a_3$, $a_4$, $a_5$, and five time constants $T_1$, $T_2$, $T_3$, $T_4$, $T_5$. The circuitry in FIGS. 3c and 3d, which is a representation of this mathematical model, is designed to provide direct readouts for each of the 10 parameters.

The circuit of the model, therefore, includes five modules 106, 107, 108, 109, 110, each of which produces a readout of one amplitude coefficient and one time constant for each order. Each of the modules 106—110 is substantially similar in construction and operation and, therefore, only the module 106 will be described in detail. The module 106 includes a summer 111 formed by an operational amplifier 112, an input resistor 113 and a feedback resistor 114. The amplifier 112 also includes an input resistor 115. It can be seen that the input resistor 113 is connected directly to the output from the pulse generator 13. The output of the operational amplifier 112 is connected to one terminal of a time constant potentiometer 116, the other terminal of the potentiometer 116 being grounded. The potentiometer 116 is provided with a control dial 116' mounted on the control panel 5. The movable element of the potentiometer 116 is connected to the input resistance 117 of an integrator 118. The integrator 118 includes an operational amplifier 119 and a feedback capacitor 120. Interposed between the movable element of the potentiometer 116 and the input of the operational amplifier 119 are a pair of reset contacts 121, which are operable by a relay reset coil 122. The reset relay coil 122 is operatively connected to and operable by the mode control circuit described hereinabove. Also connected in feedback relationship with the contact 121 is a feedback resistor 123, which is designed to reset the integrator to a zero position after each compute cycle. The module 106 also includes an inverter 124, which is connected to the output side of the operational amplifier 119. The inverter 124 includes an operational amplifier 125 having an input resistor 126 and a feedback resistor 127. The output of the inverter 124 is connected through the resistor 115 to the input of the summer 111.

The input from the pulse generator 13 feeding the summer 111 through the input resistor 113, in conjunction with the integrator 118 and the inverter 124, will simulate the transfer function of a system described by a first order differential equation. Connected in parallel with the inverter is a direction switch 128 having a "plus" position, a "minus" and an "off" position. The direction switch 128 is designed to provide proper sense of the module simulation with regard to the unknown process. The direction switch 128 is mounted on the control panel 5 for operation thereof. At the output of the switch 128, the circuit thus far described will have transfer characteristics of a first order system with an amplitude coefficient of plus or minus one. In order to provide numbers other than one as an amplitude coefficient, the movable element of the switch 128 is connected to an amplitude potentiometer 129 having a control dial 129' mounted on the control panel 5. The movable element of the potentiometer 129 is connected through an input resistor 130 to a summer or "totalizer" 131. The totalizer 131 may have a gain greater than one and of any desired value on the various inputs as constructed. The potentiometer 129 is connected so that it can select any portion of the gain of the totalizer 131. The gain between the input of the module 106 and the output of the switch 128 is one. The potentiometer 129 provides a selection of any number less than one to be multiplied by the fixed gain in the associated input of the totalizer 131. The value of $a$ is, therefore, equivalent to the position of the potentiometer 129 multiplied by the fixed gain of the totalizer 131.

By reference to FIGS. 3c and 3d, it can be seen that each of the modules 106—110 is substantially similar in construction. The method of calculating the amplitude coefficient in each module 107—110 is substantially similar to the method employed in determining the amplitude coefficient $a_1$ in the module 106. Thus, the module 107 is provided with a direction switch 132 having an "off" position, a "plus" position and a "minus" position. The direction switch 132 is designed to provide the proper sense of the amplitude coefficient $a_2$ in the module 107 with regard to the unknown process. Each of the modules 108, 109, 110 is also provided with direction switches 133, 134 and 135 respectively. Each of the direction switches 133, 134 and 135 is designed to provide the proper senses of the amplitude coefficients $a_3$, $a_4$, $a_5$ in each of the modules 108, 109, 110 with regard to the unknown process. Moreover, by reference to FIG. 1, it can be seen that each of the direction switches 132—135 is mounted on the control panel 5. The movable elements of each of the direction switches 132, 133, 134 and 135 are connected to amplitude potentiometers 136, 137, 138 and 139 respectively, having control dials and all of which are mounted on the control panel 5. Each of the potentiometers 136—139 is similar to the potentiometer 129 and are connected through input resistors 140, 141, 142 and 143 respectively to the totalizer 131.

The totalizer 131 comprises a medium gain operational amplifier 144 and a feedback resistor 145 connected in parallel therewith. The totalizer 131 also includes the five input resistors 130, 140, 141, 142 and 143. The values of the various input resistors 130 and 140—143 are sized to give a proper gain constant with respect to the feedback resistor 145 so that the various ranges of the amplitude coefficients $a_1$—$a_5$ can be assigned to the respective potentiometers 129 and 136—139. It can thus be seen that the values of each of $a_2$, $a_3$, $a_4$, $a_5$ is equivalent to the position of the respective potentiometers 136, 137, 138 and 139 multiplied by the fixed gain of the totalizer 131.

As indicated above, each of the modules 106—110 includes a summer, an integrator and an inverter. The summer of the module 107 includes an amplifier 146 having an input resistor 147 which is connected to the output of the integrator 118 in the module 106. The amplifier 146 is also provided with an input resistor 148 which is connected to the output of the summer 111 in the module 106. In similar manner, the module 108 is provided with an amplifier 149, which is connected through input resistors 150, 151 to the outputs of the integrator and summer respectively of the module 107. The summer of the module 109 is provided with an operational amplifier 152, which is connected through input resistors 153, 154 to the outputs of the integrator and summer respectively of the module 108. Finally, the summer of the module 110 is provided with an amplifier 155, which is connected through input resistors 156, 157 to the outputs of the integrator and summer, respectively, of the module 109. Each of the modules 106—110 would provide the same form of input over output characteristic if the connecting input resistors 148, 151, 154 and 157 were removed. The transfer function of the integrator is $1/s$. From a study of the feedback relations in each of the modules 106—110, it can be seen that the resistor 148 supplies the term $[-T_1 s]$ and the resistor 147 provides the term $1/T_1 s 1$ when combined with the associated summer in the model equation. In similar manner, the resistor 151 provides the term $[-T_2]$ and the resistor 150 provides the term $1/T_2 s + 1$ when combined with the associated summer; the resistor 154 supplies the term $[-T_3]$, the resistor 153 supplies the term $1/T_3 s + 1$ when combined with the associated summer; the resistor 157 supplies the term $[-T_4]$ and the resistor 156 supplies the term $1/T_4 s + 1$ when combined with the associated summer, in the model equation. The module 110 supplies the value $1/T_5 s + 1$. It can be seen that by going through each module the output of said module is equivalent to the input of the module multiplied by the characteristic function of said module. Thus, the output of the fifth module 110 is the product of all modules 106—110 characteristic function times the input signal.

By further analysis of the circuit in FIG. 3c and 3d, it can be seen that the output of the first module 106 produces the normalized first term in the orthogonal set, namely $1/T_1 s + 1$; the output of the module 107 produces the normalized second term in the orthogonal set, namely $$\pm \frac{(1-T_1 s)}{(T_1 s+1)(T_2 s+1)}$$

the output of the module 108 produces the normalized third term in the orthogonal set, namely $$\pm \frac{(1-T_1 s)(1-T_2 s)}{(T_1 s+1)(T_2 s+1)(T_3 s+1)}$$

the output of the fourth module 109 produces the normalized fourth term in the orthogonal set, namely $$\pm \frac{(1-T_1 s)(1-T_2 s)(1-T_3 s)}{(T_1 s+1)(T_2 s+1)(T_3 s+1)(T_4 s+1)}$$

and the output of the fifth module 110 produces the normalized fifth term in the orthogonal set, namely $$\pm \frac{(1-T_1 s)(1-T_2 s)(1-T_3 s)(1-T_4 s)}{(T_1 s+1)(T_2 s+1)(T_3 s+1)(T_4 s+1)(T_5 s+1)}$$

The terms in this orthogonal set are orthonormal because each amplitude coefficient $a$ is one in the above case. In other words when all modules are connected together in the manner as shown in FIGS. 3c and 3d with the exclusion of the amplitude potentiometer, an orthonormal set is produced. When the totalizer 131 is included and the $a$ functions are not equal to one, an orthogonal set is produced.

The summer amplifiers 146, 149, 152 and 155 in each of the modules 107, 108, 109, 110 has outputs connected directly to time constant potentiometers 158, 159, 160, 161 respectively. The opposite terminals of each of these potentiometers 158—161 are grounded. Furthermore, the movable arms of each of the potentiometers 158—161 are connected to reset contacts 162, 163, 164 and 165. The time constant potentiometers 158, 159, 160 and 161 as well as the time constant potentiometer 116 are mounted on the control panel 5 in the manner as illustrated in FIG. 1.

In order to understand the operation of each of the modules 106—110 in determining the time constant $T$, it is necessary to consider each of these modules separated at the connecting resistors such as the input resistors 147,148. Thus, the module 106 would be considered without the resistors 147,148 and the module 107 would be considered as including the input resistors 147,148 and excluding the input resistors 150,151. Each of the modules 106—110 when considered in the autonomous state operates in like manner and, therefore, the operation of one module is described in detail herein.

Considering the module 106, the module includes the summer 111, the time constant potentiometer 116, the integrator 118 and the inverter 124. In order to understand the theory of the production of the time constant, it is necessary to briefly set forth the mathematical theory of each module. The summer 111 takes each of two input signals, combines the signals, inverts the combined signal and presents the results on its output. The potentiometer 116 receives the output signal from the summer 111 and produces a proportional amount of the summer 111 output as its signal which is dependent upon the potentiometer setting. The output signal from the potentiometer 116 is integrated with respect to time and inverted by the integrator 118 and is presented on the output of the integrator 118. The signal from the output of the integrator 118 is inverted through the inverter 124 and is presented as one of the inputs to the summer 111. From the analysis of the following relationships, it can be seen that the time constant $T_1$ is produced. It is desirable to find the integrator output voltage from the module 106 in terms of the input voltage. It is also desirable to find the sum of the output voltage and the feedback voltage to the summer in terms of the input voltage. If $K$ represents the potentiometer setting and $T$ represents the time constant, then $$T = \frac{1}{K}$$

Moreover, if $e_o$ is equal to the integrator output voltage and $e_{in}$ is equal to the input voltage, it can be proved that:

$$\frac{e_o}{e_{in}} = \frac{1}{1+T_s}$$

In order to determine the sum of the summer output voltage and the integrator output voltage in terms of the input voltage, it is only necessary to find the summer output voltage in terms of the input voltage and add the same to the output voltage in terms of the input voltage. Permitting $e_s$ to represent the summer output voltage, it can be proved by the analysis of the above circuit that:

$$\frac{e_s}{e_{in}} = \frac{-T_s}{T_s+1}$$

Adding each of the above output voltage relationships, it can be seen that the sum of the summer output voltage and integrator output voltage in terms of the input voltage is equal to:

$$\frac{e_s}{e_{in}} + \frac{e_o}{e_{in}} = \frac{1-T_s}{T_s+1}$$

It can thus be seen that each of the modules 106—110 will produce each of the two aforementioned outputs when each module is considered in an autonomous state. It is now possible to consider the additive effects of each of the modules when connected in the manner as illustrated in FIGS. 3c and 3d.

If $e_{s_1}$=summer output voltage of module 106

$e_{s_2}$=summer output voltage of module 107

$e_{s_3}$=summer output voltage of module 108

$e_{s_4}$=summer output voltage of module 109

$e_{s_5}$=summer output voltage of module 110 and $e_{o_1}$=integrator output voltage of module 106

$e_{o_2}$=integrator output voltage of module 107

$e_{o_3}$=integrator output voltage of module 108

$e_{o_4}$=integrator output voltage of module 109

$e_{o_5}$=integrator output voltage of module 110 and $e_{in_1}$=input voltage from pulse generator to module 106

$e_{in_2}$=input voltage from integrator of module 106 to summer of module 107

$e_{in_3}$=input voltage from integrator of module 107 to summer of module 108

$e_{in_4}$=input voltage from integrator of module 108 to summer of module 109

$e_{in_5}$=input voltage from integrator of module 109 to summer of module 110.

and $T_2$=time constant of module 107

$T_3$=time constant of module 108

$T_4$=time constant of module 109

$T_5$=time constant of module 110 it can be seen that:

$$\frac{e_{o_1}}{e_{in_1}} = \frac{1}{T_1s+1}$$

$$\frac{e_{o_2}}{e_{in_2}} = \frac{1}{T_2s+1}$$

$$\frac{e_{o_3}}{e_{in_3}} = \frac{1}{T_3s+1}$$

$$\frac{e_{o_4}}{e_{in_4}} = \frac{1}{T_4s+1}$$

$$\frac{e_{o_5}}{e_{in_5}} = \frac{1}{T_5s+1}$$

also $$\frac{e_{o_1}}{e_{in}} + \frac{e_{s_1}}{e_{in}} = \frac{1-T_1s}{T_1s+1}$$

and $$\frac{e_{o_2}}{e_{o_1}+e_{s_1}} = \frac{1-T_1s}{T_1s+1} \cdot \frac{1}{T_2s+1}$$

$$\frac{e_{o_3}}{e_{o_2}+e_{s_2}} = \frac{(1-T_2s)}{(T_2s+1)(T_3s+1)}$$

etc.

Thus, it can be seen $$\frac{e_{o_3}}{e_{in}} = \frac{(1-T_1s)(1-T_2s)}{(T_1s+1)(T_2s+1)(T_3s+1)}$$

In similar manner, the additional model sets can be written for the remaining terms in the model equation. It can thus be seen that $\frac{e_{o_4}}{e_{in}}$ produced by the module 109 and $\frac{e_{o_5}}{e_{in}}$ produced by the module 110 are produced in like manner. Accordingly, from the above analysis, it can be seen that each of the amplitude coefficients and each of the time constants are produced by the five modules 106—110 in combination in the model M.

Oscillatory Transients Generator

The orthogonal model M as hereinabove described is only capable of simulating a system with real roots in the denominator of its characteristic equation. In some processes, imaginary roots exist in the denominator of this same characteristic equation and this is exhibited by oscillatory transients. In order to accurately simulate processes of this latter type, it is necessary to provide a simulation of the oscillatory transient on the signal from the model. The oscillatory transients generator T is connected in parallel with the model M and may be optionally interposed in the circuit by means of the switch 30. By reference to FIGS. 2 and 3c, it can be seen that the switch 30 is a three position switch, having a "plus," "-minus" and "off" position. The transients generator is designed to produce a sinusoidal output of selected frequency and damping. The transients generator T is also designed to provide a variable phase shift of up to 90°. The switch 30 will provide a phase shift of 180° and coupled with the 90° phase shift can provide a complete effective phase shift of 360°. It is known that the solution of the following second order differential equation is an oscillatory variance in the variable $x$.

$$\frac{d^2x}{dt^2}+2\zeta\omega_n\frac{dx}{dt}=\omega_n^2x=0$$

where $\omega_n$ is the undampened natural frequency and $\zeta$ is the damping ratio. If $p$ is substituted for $d/dt$, the characteristic equation may be written as:
$p^2+2\zeta\omega_n p+\omega^2=0$
from which the two roots are $$p_1=-\left[\zeta-\sqrt{\zeta^2-1}\right]\omega_n$$

$$p_2=-\left[\zeta+\sqrt{\zeta^2-1}\right]\omega_n$$

When $\zeta<1$, the system has complex roots and the oscillatory response is given by the equation $$x(t)=\frac{C_o}{\sqrt{1-\zeta^2}}e^{-\zeta\omega_n t}\sin\left[\sqrt{1-\zeta^2}\omega_n t+\phi\right]$$

where $$\phi=\tan^{-1}\sqrt{1-\zeta^2}/\zeta$$

For the limiting case where $\zeta=1$, critical damping occurs and the response is
$x(t)=C_o(1+\omega_n t)e^t_{-|\omega_n t}$
When $\zeta=0$, the system is described by a sinusoid
$x(t)=C_o\sin[\omega_n t+\Phi]$ $$\text{where } \phi=\tan^{-1}\frac{1}{0}=90°$$

Therefore, the equation can be written as
$x(t)=C_o\cos\omega_n t$.
The oscillatory transients generator circuit as illustrated in FIG. 3c is an analogue of the solution to the above second order differential equation.

The oscillatory transients generator T comprises an inverter 166, the input of which is connected directly to the output of the pulse generator 13. The output of the inverter 166 is connected directly to the switch 30 which is, in turn, connected to the input of a summing inverter 167. The inverter 166 in combination with the switch 30 is designed to provide the 180° phase shift of the output signal from the transients generator T. The output of the summing inverter 167 is connected to a frequency adjusting potentiometer 168 having a control dial mounted on the control panel 5. The movable arm of the potentiometer is connected to a summing integrator 169 which integrates the signal from the potentiometer 168. The output of the summing integrator 169 feeds a second potentiometer 170 which is mechanically connected to and operable with the potentiometer 168 in the manner as illustrated in FIG. 3c. The potentiometer 170 also adjusts the frequency. In effect, therefore, the two potentiometers 168 and 170 operating in tandem provide frequency adjustment. The output of the potentiometer 170 is, in turn, connected to a second integrator 171 and the output of the integrator 171 for feedback to one of the inputs of the summing inverter 167. A decay control potentiometer 172 having a dial mounted on the control panel 5 is connected to the output of the summing integrator 169 and to an input thereof. The decay control potentiometer 172 provides values of the damping ratio $\zeta$ from 0 to 1. If the decay control potentiometer 172 is set at a 0 position, continuous oscillation would exist and if it were set at a maximum position of 1, critical damping would occur. A phase control potentiometer 173 has a pair of terminals, one of which is connected to the integrator 169 and the other of which is connected to the integrator 171. The potentiometer 173 has a control dial mounted on the control panel 5. The phase control potentiometer 173 is designed to combine the oscillatory output of the integrator 169 and the output of the integrator 171 which has been delayed 90°. The movable arm of the phase control potentiometer 173 is connected to the input of an inverter 174. By shifting the movable arm of the potentiometer 173 through its entire span, it is possible to obtain a change in phase of 90°. The output of the inverter 174 is connected to an amplitude control potentiometer 175 having a control dial mounted on the control panel 5, the opposite end of the potentiometer 175 being grounded. The movable arm of the potentiometer 175 is connected through an input resistor 175' to the input of the amplifier 144 in the summer 131. The amplitude control potentiometer 175 is designed to vary the total amplitude of the oscillatory signal from the oscillatory transients generator T. The integrator 169 and the integrator 171 are provided with reset relay contacts 176, which are operable by a reset relay coil 176' for resetting of the oscillatory transients generator T after each compute signal. The relay coil 176' is connected to and operable by the mode control circuit in the manner as previously described.

Electrical and Pneumatic Range Selector

By reference to FIGS. 2, 3d and 3e, it can be seen that the signal from the pulse generator 13 is transmitted through a summer 177 to the selector switch 27 where transmission may be optionally directed to either the electrical range selector 22 or the electrical-to-pneumatic transducer 23. The block diagram of FIG. 2 provides a schematic illustration of the function of the combined electrical and pneumatic range selector, the circuitry of which is illustrated in FIG. 3e. The circuit, however, is combined so that the range selector 22 and the converter 23 function as a unitary component system. In like manner, the output of the process P is directed to the range converter 32 and pneumatic-to-electric transducer 31 in the block diagram of FIG. 2. Again, this is a functional illustration and these two components are combined in the electric and pneumatic range selector of FIG. 3e. In essence, the two converters 23,31 and the two range selectors 22,32 are combined to form the electrical and pneumatic range selector. However, by reference to FIG. 3e, it can be seen that the upper portion of the circuit provides a selection of the desired signal to the process and the lower portion of the circuit provides a selection of the desired signal from the process.

The summer 177 comprises an operational amplifier 178 with an input resistor 179 and a feedback resistor 180 so that the summer 177 also serves as an inverter. Also connected to the input of the amplifier 178 is an input resistor 181, which is also connected to the movable element of a static process position potentiometer 182 having a control dial 183 mounted on the control panel 5. One terminal of the potentiometer 182 is connected to a minus reference voltage from the power supply S and the opposite terminal of the potentiometer 182 is grounded in the manner as shown in FIG. 3e. Connected to the output of the amplifier 178 is a conventional voltmeter 184 having a dial face 185 mounted on the control panel 5 and which is designed to show the operating level of the process P. The output of the amplifier 178 and the voltmeter 184 is, in turn, connected to the movable element of the switch 27. The static process position potentiometer 182 and the voltmeter 184 are designed to provide the same reference level input signal from the pulse generator 13 on which the process P normally operates.

The switch 27 is a two position switch having an electrical position and a pneumatic position. By reference to FIGS. 1 and 3e, when the switch 27 is shifted to the "pneumatic" position (lower position), the signal from the output of the summer 177 is transmitted to the electrical-pneumatic or E–P transducer 23. Interposed between the switch 27 and the transducer 23 is a pneumatic range selector switch 186 having a plurality of pneumatic input ranges. The switch 186 is designed to have the ranges which are commonly found in pneumatic control systems. In the present application, a two-position pneumatic range selector switch has been adopted since the vast majority of pneumatic control systems operate on a 3—15 p.s.i.g. or a 6—30 p.s.i.g. range. The output of the transducer 23 is provided with the pneumatic fitting 9 for optional connection to the process P. In this connection, it should be understood that the transducer 23 may be provided with more than one setting for variable situations.

When the switch 27 is shifted to the "electrical" position (upper position), the switch 27 is connected to a voltage divider circuit consisting of fixed resistors 187,188. Connected to the common terminal of the resistors 187,188 is a multiple position, rotary, electric range selector switch 189 having a desired electrical range at each range position. The pneumatic range selector switch 186 and the electrical range selector switch 189 have control dials 190,191, respectively which are mounted on the control panel 5 in the manner as illustrated in FIG. 1. By further reference thereto, it can be seen that the range selector switch 189 herein employed is provided with four positions, namely a 1—5 milliamp position, a 10—50 milliamp position, a 1—5 volt position and a 1—9 volt position.

The movable element of the range selector switch 189 is connected to a current voltage converter 192 which includes a summer inverter 193 formed by an operational amplifier 194 with an input resistor 195 and a feedback resistor 196. The voltage current converter 192 also includes a second inverter circuit 197 having an operational amplifier 198, an input resistor 199 and a feedback resistor 200. Connected to the output of the amplifier 198 is a resistor 201 which serves as an input resistor to the amplifier 194. Connected to the output of the amplifier 194 is a series resistor 202 and a second series resistor 203.

By reference to FIG. 3e, it can be seen that the upper position of the switch 189 is connected directly to the upper position of the switch 27. The remaining positions are connected in common to the voltage divider resistors 187,188. Connected to the series resistor 202 is the movable element of a four-position switch 204. The two current positions of the switch 204 are connected to the input resistor 199 and the two voltage positions of the switch 204 are connected to the output of the amplifier 194. Also connected to one terminal of the series resistor 203 is the movable element of a four-position rotary switch 205 having only the lowermost contact point connected directly to the output of the amplifier 194. It can be seen that the switches 189, 204 and 205 are mechanically actuated in common or "ganged" so that they operate in unison. Furthermore, only the control dial 191 of the switch 189 is mounted on the control panel 5 for common actuation of each of the switches 189, 204 and 205.

By further reference to FIG. 3e, it can be seen that the amplifier 194 and the resistors 195, 196 and 201 form a summer inverter. When the switch 204 is in either of the two lower positions; that is, the current positions, the resistor 202 forms a positive feedback path through the inverter circuit 197 and back to the inverter 193. If the load resistance in the process were of zero magnitude, there would be no positive feedback loop, and thus the current in the resistor 202 is equivalent to minus the input voltage to the amplifier 194 divided by the value of the resistor 202. If the resistance of the process were of large magnitude, then the positive feedback path through the inverter 197 would approximately equal the negative feedback across the resistor 196 and this would cause the output voltage of the amplifier 194 to increase until the same value of current was attained in the resistor 202 that was present when the load was of zero resistance. When the switches 189, 204, and 205 are unitarily switched to the lowermost position, the resistor 203 is placed in parallel with the resistor 202, thus causing more current to flow from the amplifier 194 to the process P for a given input voltage. Thus, it can be seen that when the switch 189 and the unitarily actuated switches 204,205 are shifted to either of the lowermost positions, an output current signal is provided independently of the process resistance and dependent only on the input voltage signal to the voltage divider consisting of resistors 187,188. When the switch 204 is shifted to either of the two upper positions, the series resistors 202,203 are effectively removed from the circuit and the positive feedback loop is also removed permitting the inverter 193 to operate as a negative feedback inverter. Thus, the output voltage of the inverter 193 is independent of the process resistance and dependent only on its input voltage. The switch 189 merely serves to change the scale of the input voltage-current converter 192 by tapping the divider circuit consisting of resistors 187,188. This type of range selector switching circuit where output voltage and output current is independent of load impedance is more fully illustrated and described in copending application Ser. No. 509,101 filed Nov. 22, 1965.

Thus, it can be seen that the desired input pulse can be manufactured and transmitted to the process P. The transmission of the pulse to the process P will create an output pulse at the selected point of measurement. It should be recognized that the rapid process simulator A is not necessarily connected to the process either electrically or pneumatically. In many cases, the process is provided with process instrumentation which may be either pneumatic or electrical or both and the rapid process simulator A can be connected to the process instrumentation. However, when reference is made to an operative connection between the rapid process simulator A and the process P in this application, it should be understood that the process P is, therefore, defined to include the process instrumentation associated therewith as well as the physical process itself.

As pointed out above, the rapid process simulator A offers utility with mechanical, electrical, biological, chemical systems, etc. In fact, it can be realized that the rapid process simulator A can be employed with any process as long as conventional conversion components are employed to convert the signal of the process to either pneumatic or electrical signals as described herein. For example, if a chemical system is to be analyzed which has pneumatic instrumentation, the E–P transducer 23 and the P–E transducer 31 are connected to the process. On the other hand, if the process has electrical instrumentation, the connecting lines from the electrical and pneumatic range selector are directly connected to the process at the desired input and output points.

Assuming that the process P was pneumatic and the transducer 32 was connected thereto at the desired output signal point, a pneumatic signal from the process P would be converted in the P–E converter 31 to an electrical signal for transmission to the movable arm of a pneumatic range selector switch 206. The pneumatic range selector switch 206 is substantially identical to the pneumatic range selector switch 186 and is ganged therewith so that the switch 206 is mechanically actuated by the switch 186. Therefore, the switch 206 is not mounted on the control panel 5. The input signal from the transducer 31 is also transmitted to a pair of series connected input resistors 207,208 of a scale converter summer 209. By reference to FIG. 3e, it can be seen that the switch 206 is connected across the resistor 207 for shorting the same in a manner hereinafter described in detail. The electrical output from the transducer 31 will have twice the magnitude on the 6—30 scale as it does on the 3—15 scale. Thus when the resistor 207, which has equal resistance value to the resistor 206, is shorted, the gain of the summer 209 is double. The summer 209 includes an operational amplifier 210 having a feedback resistor 211.

The model M normally operates on a static voltage level having a zero magnitude. The process P obviously does not operate on a zero static level and in order to remove the static position or quiescent value from the process output signal, a second static process position potentiometer 212 is employed. The movable arm of the potentiometer 212 is connected through an input resistor 213 to the input of the amplifier 210 so that the quiescent level signal from the potentiometer 212 is subtracted from the process output signal. The coil of the potentiometer 212 has one terminal connected to a minus reference voltage from the power supply S and has the opposite terminal thereof grounded. Also connected to the movable element of the potentiometer 212 is a conventional voltmeter 214 having one terminal thereof grounded. The voltmeter 214 serves to determine the quiescent level of the process output signal and by adjustment of the potentiometer 212, it is possible to completely eliminate the quiescent level from the process output signal. The potentiometer 212 has a control dial 215 mounted on the control panel 5 and the voltmeter 214 has a dial face 216 also mounted on the control panel 5.

If the process P were an electrical process, an output signal line 217 would be connected to the process P. The line 217 is connected directly to a current-voltage converter circuit 218 having a pair of resistors 219,220 connected in series. Connected in parallel with the resistor 219 is the movable arm of a four-position rotary switch 221. The purpose of the switch 221 is to short out the resistor 219 when the movable element is shifted to any of the three lower positions in the manner as shown in FIG. 3e. This will allow the output of the scale converter summer 209 to be of the same magnitude whether the input signal is within the range of 1—5 or 1—9 volts because the ratio of the magnitudes of the two resistors 219,220 is 5:4. The movable arm of another four-position rotary switch 222 is also connected to one terminal of the resistor 219. The four contact positions of the switch 222 are connected through a process terminating resistor 223 for 1—9 volt systems, a process terminating resistor 224 for 1—5 volt systems, a process terminating and converting resistor 225 for 1—5 milliamp systems and a process terminating and converting resistor 226 for 10—50 milliamps, respectively. Each of these resistors 223—226 is, in turn, grounded. The switches 221,222 are also mechanically connected to and actuable by the switch 189. When the switch 189 and the actuable switches 221,222 are in the uppermost position, the resistor 223 is switched into the circuit. Similarly, if any other position is selected, the proper terminating and converting resistor will be interposed into the system. The values of the resistors 223-—226 are designed to give the proper voltage on the scale converter summer 209 for the various switch positions. It should also be recognized that the electrical signal may have a quiescent value which must be removed by adjustment of the potentiometer 212 in the same manner as previously indicated.

Adder

The output signal from the scale converter summer 209 which provides the process output signal is transmitted to the adder or so-called "summer" 33 substantially as illustrated in FIG. 3f. The summer 33 generally comprises an operational amplifier 227 having an input resistor 228 connected to the output of the amplifier 210 in the summer 209. A feedback resistor 229 is also connected across the amplifier 227. The signal from the model M is transmitted to the amplifier 227 through an input resistor 230. The summer 33 is designed to combine the output signals of the process and the model and thereby subtract the signal of the process from the signal of the model to produce an error signal. The various taps 34, 35, 36 are also connected to the summer as illustrated in FIG. 3f and also connected to the three channel oscillographic recorder 40.

Squarer

The signal from the summer 33 is then transmitted to the squarer 37 which is also illustrated in FIG. 3f. The squarer 37 contains a part of a conventional quarter square multiplier which requires both positive and negative input signals. Therefore, the squarer 37 includes an inverter 231. The portion of the conventional quarter square multiplier employed herein has a performance function of $(x+x/2)^2$. This portion of the circuit generates a summing junction current proportional to a 10-segment approximation to this equation. The positive signal from the inverter 231 and the negative signal from the summer 33 are transmitted through resistors 234,235 and diodes 236,237. This combination of resistors and diodes produces a voltage to the diode junction proportional to $x+x/2$ or $2x/2$. If $x$ is less than zero, the diode 236 will conduct and if $x$ is greater than zero, the diode 237 will conduct. The voltage $x$ at the junction of the diodes 236,237 drives a biased-diode network consisting of slope resistors 238, 239, 240... The biased-diode network also includes breakpoint resistors 241,242... and diodes 243,244... As illustrated, 10 slope resistors and 10 diodes are employed in the biased-diode network. For small values of $x$, none of the diodes will conduct and current proportional to $x$ will flow through the resistor 238 to a summing junction 245. As the value of $x$ increases, the diode 243 will conduct, then the diode 244 will conduct, etc. This provides an ever increasing slope for increasing values of $x$ and the result is a 10-segment approximation to a parabola $x^2$. A trimpot 246 is connected to the resistor 238 and to the output of the diode junctions 236,237 for adjusting the gain of the parabolic function. A resistor 247 is connected to the resistor 238 and provides a bias current so that the net current to the summing junction 245 is zero when $x$ equals zero. It should be recognized that any other exponential power function such as $x^3$, $x^{13}$, etc. could be obtained from the signal transmitted from the summer 33 and accordingly when the term "power means" is used in the appended claims, this term will refer to the squares 37 and the exponential power would be equivalent to the same mathematical expression.

Integrator

The output of the squarer 37 is then transmitted to the integrator 38, which is also illustrated in FIG. 3f. The integrator 38 provides the integral of the error squared inasmuch as the squarer 37 which acts as an input resistor, functions as a variable resistor which provides the square law resistance change. The integrator 38 generally comprises an operational amplifier 248, a capacitor 249 connected in feedback relationship and having a reset resistor 250. The integrator 38 also includes reset relay contacts 251, which are operable by a relay coil 252, the latter in turn being connected to the mode control circuit for resetting of the integrator 38 after each compute signal. The output of the integrator 38 is connected to the digital voltmeter 39 in the manner as illustrated in FIGS. 2 and 3f.

OPERATION

In use, the rapid process simulator A can be easily and conveniently transported to almost every type of location in which study of a plant process is necessary. Portability and compactness of this simulator lends greatly to its utility. The rapid process simulator A is capable of operating on 115 volt alternating electrical current, which is the type commonly found in normal plant operating conditions. In order to describe the operation of the rapid process simulator, it may be assumed that all of the switches located on the control panel which have an "off" position are located in the "off" position. The main power switch $s$ is shifted to the "on" position so that electrical power is supplied to the power supply S. This, in turn, energizes the various operational amplifiers hereinabove described.

The mode control switch 48 is shifted to the "reset" position. Inspection is made to determine whether the process is electrical or pneumatic and the proper range is then selected. This may be conveniently accomplished by observing the present instrumentation on the process. A study of the process is then made to determine where input pulses are to be injected in the process and output pulses extracted therefrom. By further observation of the process during normal operation thereof and more particularly by observation of available instrumentation on the process, it is possible to determine the normal operating level of the input in question. It is also possible, by observation of the existing equipment to determine the corresponding levels at other points in the process and particularly the point selected for extracting output signals. After determination of the proper tapping points, that is the points at which the rapid process simulator A is connected, the process is shut down and the rapid process simulator A connected thereto. If the process is pneumatic, the fittings 9 are connected by any suitable type of pneumatic piping (not shown) to the input and output points of the process and if this process is electrical, the proper terminals on the terminal connector 8 are wired to the process P in the manner as schematically illustrated in FIG. 3f. It should be understood in this connection that it may not be necessary to shut down the process P. It is possible, in many cases, to tap electrically or pneumatically various points on the process without interruption thereof.

The selector switch 27 provides a selection between the electrical range selector 22 and the process range converter 23 for inserting the proper pulse into the process. If the process P is an electrical process, the switch 27 is shifted to the upper position or "electrical" position. Similarly, if the process is a pneumatic process, the switch 27 is shifted to the lower position, the "pneumatic" position. For the selection of either the electrical or pneumatic positions with regard to the switch 27, the control dials 190,191 are operated for pneumatic and electrical ranges respectively. By operation of the dial 191, the electrical range selector switch 189 can be set to the desired milliampere or voltage range and by operation of the control dial 190, the pneumatic range selector switch 186 can be set to the desired pressure range. Operation of either of the switches 186,189 will operate the electrical and pneumatic range selector in the manner as previously described thereby producing a voltage output signal or pneumatic output signal within the proper range to the process P. Similarly since the various four-position selector switches 189, 204, 205, 221 and 222 are "ganged" so that they operate by actuation of the switch 189, the output from the process P will also be within the proper range for further operation in the rapid process simulator A.

By further observation of the present operating variables, it is possible to duplicate the normal operating level by adjustment of the control dials 183,215, which in turn, actuate the static process position potentiometers 182,212 respectively. The dial 183 is turned until the voltmeter 184 corresponds to the operating level of the process as observed on the normal process instrumentation. Thereafter, the dial 215 operating the potentiometer 212 is turned until the error signal appearing in channel 2 of the oscillograph recorder 40 is zero. At this point, the reading on the voltmeter 214 will correspond to the operating level value of the selected process variable.

After the desired electrical or pneumatic ranges have been selected, it is then possible to produce the desired disturbing pulse for injection into the process P. If it is possible by observation of the process alone to determine whether a square wave or a ramp wave would produce better results, the switch 26 may be shifted to either the square wave (upper) position or the ramp wave (lower) position. If it is not possible to determine by observation of the system which type of wave would be more preferable, the square wave may be optionally selected as a starting point. The switch 26 would then be shifted to the upper position. Again, if it is possible to determine by observation whether the disturbing pulse should be plus or minus, the pulse direction switch 65 can be shifted to either the upper (or plus) position or the lower (or minus) position. If it is not possible to determine by observation the desired position, the plus position may be optionally selected as a starting point and the switch 65 would be shifted to its upper position, reference being made to FIGS. 1 and 3a. The height/rate potentiometer 68 is turned to a very small value by means of the height/rate control dial 68' so that the signal which is initially injected into the process P does not have a critically large disturbing influence. For similar reasons, the delay control potentiometer 82 is turned to a low position through the delay control dial 84 and the duration control potentiometer 86 is also turned to a low position by means of the duration control dial 86'. Initially, a middle value on the range of the time compute control mechanism 12 is selected and adjustment thereof is made by means of the control dial 46. The delay time is generally selected at the convenience of the operator by determining when it is desirable to have the first pulse injected into the process after the mode control switch 48 is shifted to the "operate" position.

After the various settings to produce the disturbing pulse have been made on the control panel 5, the mode control switch 48 is shifted to the "operate" position, that is to the right, reference being made to FIG. 1. When the mode control switch 48 is shifted to the "operate" position, the process channel 1 and the error channel 2 of the recording oscillograph 40 will be energized. The error signal which appears on channel 2 should be substantially of opposite magnitude and similar shape to the process signal. The process signal may initially appear as a square wave signal, similar to the signal originally impressed on the process P. If the process signal does appear to be rectangular, the compute time mechanism 12 may be turned to a higher value by means of the control dial 46, which in turn will produce a rounded curve of the type illustrated in FIG. 6b. FIG. 6a provides a representation of the typical input waveform, the rectangular wave, and FIG. 6b provides the process output waveform substantially more rounded than the rectangular input wave. If no pulse is observed after shifting the mode control dial 48 to the "operate" position, the duration of the pulse or the amplitude of the pulse or both may be increased by turning the control dial 86' and 68' respectively to higher values.

After a desirable disturbing pulse has been produced, the pulse can be transmitted to the model M and by shifting the direction switch 128 to the "plus" position thereby interposing the first module 106 in the simulation. When the switch 128 is shifted to either the plus or minus position or if any of the switches 132, 133, 134, 135 are shifted to the plus or minus position, the model channel, channel 3 of the oscillograph recorder 40, will be energized providing a readout of the model pulse. If the model pulse curve happens to be out of phase with the process curve, then the switch 128 has been shifted to the wrong position and must be shifted to the opposite position. By shifting the switch 128 to the opposite position, the lack of phase alignment should be overcome. It is often desirable to turn the amplitude control dials such as the dial 129' and the time constant control dials such as the dial 116' to a medium position on the dial scale as an original setting and observe the model curve. The model curve, that is the curve in the third channel of the recording oscillograph 40, should approximate the process curve in channel 1. If approximation does not occur, each of the dials 129' and 116' can be turned, first one way and then the other to find the closest approximation and simultaneously the smallest error signal on channel 2 of the recording oscillograph 40. At this point, the rapid process simulator A will also provide the smallest integral of the error squared for the best values of the first order fit, in other words the best values of $a_1$ and $T_1$. Since the rapid process simulator A is on an operating condition, disturbing pulses will be continually fed to the process P and the model M. Moreover, the output of the summer, squarer and integrator is fed to the digital voltmeter 39 where the integral of the error squared with respect to time is depicted on the digital voltmeter readout panel 39'. By turning the dials 129',116', the integral of the error squared will be continually depicted on the readout panel 39'. When the smallest error signal on the readout panel 39' is obtained, then the best values for the coefficients $a_1$ and $T_1$ have been obtained and these values can be read directly on the dial face of the dials 116′,129′.

After the smallest integral of the error squared signal has been obtained for the first set of parameters, the switch 132 is shifted to a plus or minus position to insert the second module 107 into the system. Again, by observation of the model curve, a lack of phase coordination may be observed if the wrong position has been selected for the switch 132. In that event, the switch 132 is shifted to the opposite phase position. In similar manner, the control dials of the potentiometers 136,158 may be turned to a medium position at the outset. After the switch 132 has been shifted to the plus or minus position, the dials of the potentiometers 136 and 158 may be turned as desired to get the smallest error signal on the readout panel 39′. In similar manner, the direction switches 133, 134 and 135 are turned to one of the phase positions to insert the modules 108, 109, 110 respectively in the system. The amplitude control dials 137′, 138′, 139′ and the time constant control dials 159′, 160′, 161′ are similarly actuated in like manner in order to obtain the smallest error signal on the readout panel 39′. After each of these modules has been shifted into the circuit and after the smallest error signal is obtained, then the values of each of these parameters can be read off of the respective control dials. Furthermore, the closeness of fit between the process curve and the model curve can be visually observed by reference to channels 1 and 3 of the recording oscillograph 40. Moreover, the error signal with respect to time can be observed by visual observation of channel 2 of the recording oscillograph 40. FIG. 6c represents a typical model output waveform where FIG. 6b is a typical process output waveform. Moreover, FIG. 6e represents a typical waveform of the integral of the error squared with respect to time, the type of waveform which appears in channel 2 of the recording oscillograph 40.

If after the first model signal appeared in channel 3 of the recording oscillograph 40, a transport delay was noted between the output signal of the process P and the output signal of the model M, the transport delay switch 29 is shifted to the "on" position, thereby inserting the square wave sampler 18 and the ramp wave sampler 19 in the pulse generator circuit. As previously indicated, interposition of the samplers 18,19 in the circuit and hence interposition of the switching circuits 80,81 in the circuit will provide a delay of the disturbing pulse to the model with respect to the pulse to the process P. The operation of the pulse generator in producing the disturbing pulses and more specifically, the delayed disturbing pulses whether ramp or square wave was described hereinabove. After the switch 29 is shifted to the "on" position, the transport delay potentiometer 92 is actuated by the transport delay control dial 93 to produce a lag in the model output so that the process output pulse and the model output pulse will begin at coincident times. As the dial setting on the dial 93 is increased, the voltage from the potentiometer 92 is increased, thereby providing a higher voltage requirement for the initiation of the disturbing pulse from the relay comparator circuits 80,81. The potentiometer 92 is turned until the apparent lag between the process output curve and the model output curve is eliminated. This is preferably performed after observation of the first model output curve on channel 3 of the recording oscillograph 40.

It is also desirable to provide oscillatory transients on the model output curve after the best fit of the model parameters has been obtained and transients are still present as depicted on channel 1 of the oscillograph recorder 40. By shifting the switch 30 to the plus or minus position, the oscillatory transients generator T is connected in parallel with the model M and is designed to produce a sinusoidal output of selected frequency and damping. By observation of transients on the process output curve as depicted in channel 1 of the recording oscillograph 40, it is possible to determine the phase of such transients. The proper phase is then selected for these transients and the switch 30 is shifted to the desired position to acquire that phase. It can be seen that the switch 30 provides a phase control of 180°. In order to account for phase differential by additional 90° segments, the phase control potentiometer 173 can be turned. By the combination of the switch 30 and the phase control potentiometer 173, it is possible to have a complete effective phase shift up to 360°. After the proper phase of the oscillatory transients has been attained, the amplitude control dial of the potentiometer 175 is turned to match the amplitude of the transients on the process signal. In similar manner, the frequency control dial 168 is designed to match the frequency of the transients on the process output curve. In like manner, the decay control potentiometer 172 is actuated to match the decay of the transient curve impressed on the process output curve. The oscillatory transients control dials are also direct reading potentiometer dials and the readings on these dials provide the coefficients of the parameters which can be used to describe the presence of transients appearing in the unknown process. After the best fit has been obtained and the smallest error signal has been produced on the readout panel 39′, then the most accurate determination of the coefficients of the various parameters for this model have been determined on the rapid process simulator A. This smallest error signal will then represent the closest approximation to the steady state characteristics of the process, since the gain of each of the process parameters has been determined. This steady state condition is often referred to as the "steady state gain" or "0-frequency gain."

It should be recognized that the ramp wave could have been initially selected as the desired form of disturbing pulse. This wave could have been obtained merely by shifting the switch 26 to the lower or "ramp" position. However, in the majority of cases, the square wave will be initially selected as the desired form of input pulse, inasmuch as it is easier to make visual behavior judgements with this type of wave. It is possible to verify the results achieved through the use of the square wave input signals by shifting the switch 26 to the "ramp" position and obtaining ramp wave input signals. It is often desirable to verify the results obtained by use of the square wave by thereafter employing the ramp wave inasmuch as the square wave has a Fourier transform amplitude with frequency spectrum content which contains "zeroes" or points of zero amplitude. On the other hand, the Fourier transform or frequency spectrum of the ramp wave produces a relatively smooth distribution with no "zeroes."

When the mode control switch 48 was shifted to the "operate" position, the various component systems in the rapid process simulator A were automatically reset at the end of each compute cycle. At the end of the simulation, the mode control switch is shifted to the "reset" position, which places all component systems in a reset condition thereby rendering the simulator A suitable for disconnection from the process P.

THEORY OF OPERATION

In order to understand the theory of operation of the rapid process simulator A, the following determination of fundamental relationships of the noninteracting elements is provided. A linear, stable process whose dynamic characteristics are unknown will be considered. This open loop system may be described diagrammatically:

$x(t) \rightarrow g(t) \rightarrow y(t)$ where $x(t)$ is the input to the process, $y(t)$ the process output, and $g(t)$ the process impulse response function.

Similarly, associated with the process a model by the same input as follows:

$x(t) \rightarrow h(t) \rightarrow w(t)$ where $x(t)$ is an identical input to the model, $w(t)$ is the model output, and $h(t)$ the model impulse response function, which will be adjusted in such a way as to make $w(t)$ as much like $y(t)$ as possible.

Next, by combining $y(t)$ and $w(t)$ through a summing device $$e(t) = y(t) - w(t) \ ,$$

where $e(t)$ is called the error signal. The error signal is squared and integrated, allowing a continuous evaluation of the following equation:

$$|E| = \int_0^\infty e^2(t)dt$$
$$= \int_0^\infty [y(t)-w(t)]^2 dt \quad (1)$$

It is desired to adjust the model in a systematic manner such that $|E|$ will be minimized. If the input is a pulse, one may write $$X(j\omega) = \int_0^\infty e^{-j\omega t} x(t) dt$$

If $g(t)$ and $h(t)$ are stable, $$G(j\omega) = \int_0^\infty e^{-j\omega t} g(t) dt,$$

$$H(j\omega) = \int_0^\infty e^{-j\omega t} h(t) dt,$$

where
  $G(j\omega)$ is the transfer function of the process and
  $H(j\omega)$ is the transfer function of the model.

After considerable manipulation, Equation 1 can be transformed as follows:

$$|E| = \frac{1}{2\pi} \int_{-\infty}^{\infty} |X(j\omega)|^2 |G(j\omega) - H(j\omega)|^2 d\omega \quad \text{Eq. 2}$$

where
  $|X(j\omega)|^2 = X(j\omega) \cdot (-j\omega)$ and
  $|G(j\omega)-H(j\omega)|^2 = (G(j\omega)-(j\omega)) \cdot (G(-\omega)-H(-j\omega)$ Equation 2 can be used to generate $H(j\omega)$, the frequency analogue of $h(t)$.

Now let $$H(j\omega) = \sum_{i=1}^{n} a_i K_i(j\omega) \quad \text{Eq. 3}$$

where $a$ is the amplitude constant and
  $K$ is a function of $j\omega$.

If Equation 3 is substituted in Equation 2, it can be shown that a sufficient condition for $|E|$ to be a minimum and that the $a_i$ in Equation 3 to be noninteracting is for the $K_i(j\omega)$ to be orthonormal. These restrictions produce $$a_i = \frac{1}{2\pi} \int_{-\infty}^{\infty} Re(G(-j\omega) \cdot K_i(j\omega)) \cdot |X(j\omega)|^2 d\omega \quad \text{Eq. 4}$$

Equation 4 illustrates the dependence of the $a_i$ on input, model, and process. If the input is measured with care, the adjusted $a_i$ will insure a good representation of the process if the $K_i(j\omega)$'s are chosen properly. The term $K_i(j\omega)$ in the orthonormal series are selected by the Gram-Schmidt orthonormalization process.

Three orthonormal functions of a three-term set were constructed from functions of the type:

$$P_i(j\omega) = \sqrt{\alpha} \frac{(1-\alpha j\omega)^i}{(1+\alpha j\omega)^{i+1}} \quad \text{Eq. 5}$$

This choice is arbitrary depending on some prior idea of process behavior; namely that the denominator will have real roots.

From these orthonormal functions a model was constructed which has the following form:
  $H(j\omega) = a_1 K_1(j\omega) + a_2 K_2(j\omega) + a_3 K_3(j\omega)$.

The Laplace transform variable $s$ can be substituted for the quantity $j\omega$ herein.

Thus if $T$ equals unity, the orthogonal functions are of the following form:

$$K_1(s) = \frac{1-s}{1+2s+s^2}$$

$$K_2(s) = \frac{1-3.8266s+2.8227s^2}{1+3s+3s^2+s^3}$$

$$K_3(s) = \frac{1-2.5841s+4.407s^2-2.823s^3}{1+4s+6s^2+4s^3+s^4}$$

etc.

This model was formulated with the idea of choosing a pulse input in such a way as to facilitate the construction of the $K_i(j\alpha^{1/2};$ also, the $P_i(j\omega A)$ are frequency analogs of the well-known Laguerre polynomials.

The above set was made orthonormal to the input weighting function of a rectangular input pulse of duration of $T/2$. If the duration of the unknown output is long compared to the extent time of the input pulse, as will always be the case in the rapid process simulator A, the following set of polynomials may be substituted for the previous set. Thus, if $\sqrt{\alpha}=1$ and permit $i$ to be 0, 1, 2, 3, and 4 respectively, then $$K_1(s) = \frac{1}{T_1 s + 1}$$

$$K_2(s) = \frac{1-T_1 s}{(T_1 s+1)(T_2 s+1)}$$

$$K_3(s) = \frac{(1-T_1 s)(1-T_2 s)}{(T_1 s+1)(T_2 s+1)(T_3 s+1)}$$

$$K_4(s) = \frac{(1-T_1 s)(1-T_2 s)(1-T_3 s)}{(T_1 s+1)(T_2 s+1)(T_3 s+1)(T_4 s+1)}$$

and $$K_5(s) = \frac{(1-T_1 s)(1-T_2 s)(1-T_3 s)(1-T_4 s)}{(T_1 s+1)(T_2 s+1)(T_3 s+1)(T_4 s+1)(T_5 s+1)}$$

This latter set of polynomials is therefore a special case of the previous set of polynomials in that the weighting function is considered to be unity.

EXAMPLES

The invention is further illustrated by but not limited to the following examples.

Example 1

The following example demonstrates the use of the orthogonal polynomial approach using analogue computation on a repetitious basis with a portable rapid process simulator. The unknown system selected was a system of two incandescent lights and two photosensitive resistors. The bulbs and photosensitive cells were arranged in two compartments of a box with each photosensitive cell directed toward a bulb. The system of lights was selected as a demonstration of an unknown process in preference to other applications such as flow or pressure control, for reasons of portability. Furthermore, many of the dynamic characteristics of actual chemical systems are exhibited by incandescent lamp-photoresistor combinations. Moreover, the employment of a photosensitive cell-light bulb system more closely approached the realization of an existing process rather than a theoretical simulation.

In this process, the first bulb was operated at a constant light level as adjusted by the steady-state output of an amplifier. The first photosensitive cell was pointed directly at the bulb's light output and was arranged with a DC amplifier to diminish the second bulb's input for an increase in the light it senses. The second photocell was arranged in the circuit to give an output which was proportional to the intensity of the second bulb. The light from the second bulb, however, was isolated from the first photocell so that no system instabilities existed. Thus when the first bulb was pulsed, the second photocell produced an output change depending on the dynamics of the combination.

The circuitry for this example included a mechanism for producing a pulse, a combined mechanism for integrating and squaring the error, the light box representing the process and the orthogonal model.

When considering the simulation of the system of lights, the mathematical derivation of the dynamics of the system are as follows:
  The analysis of each light bulb can be represented
  in the following manner.
  Power in $(P_1)$ = Power radiated $(P_r)$ +
  Power absorbed $(P_a)$ + Power conducted away $(P_c)$ Thus:

$$\frac{E_{in}^2}{R_L} = K_1 e_t T^4 + K_2 mcp \frac{dT}{dt} + K_3(T - T_{room})$$

$e_t$ = Emissivity of tungsten
$R_L = \rho(1+\alpha T)$
$K_1$ = Stefan-Boltzmann Constant $5.67 \times 10^{18}$ watt/meter$^{2/o}k^4$
$m$ = Mass of Filament
$cp$ = Heat Capacity
$K_3$ = Coefficient of Conductivity or $$\frac{dT}{dt} = \frac{E_{in}^2}{\rho(1+\alpha T)K_2 mcp} - \frac{K_1 e_t T^4}{K_2 mcp} - \frac{K_3(T-T_{room})}{K_2 mcp}$$

A response time is associated with the output level and with the output current versus the change in light level in each of the photocells. From these response times, it was determined that the apparent time constant is not constant with level of operation, but is a definite function of the more recent history. Thus, all that could be expected from the above mathematical derivation is that this system was at least of the fourth order. Furthermore, this information could have been intuitively expected since there were four distinct elements in the system.

To determine the transfer function experimentally, the rapid process simulator was used to pulse the first light and observe the process system output. Simultaneously, the input to the orthogonal model was pulsed and its output was observed. Following this, the difference between the process and the model output was determined on an integral error squared basin. The orthogonal set employed for the model was:

$$\frac{O}{I} = \frac{a_1}{T_1 s+1} \pm \frac{a_2(1-T_1 s)}{(T_1 s+1)(T_2 s+1)}$$
$$\pm \frac{a_3(1-T_1 s)(1-T_2 s)}{(T_1 s+1)(T_2 s+1)(T_3 s+1)}$$

When the steady-state level of the light was 80 volts and the input pulse height to the unknown system was 10 volts, the values of the coefficients $a_1, a_2, a_3$ and $T_1, T_2, T_3$ were found to be:

| For an increasing pulse | For a decreasing pulse |
|---|---|
| $a_1 = 3.13$ | $a_1 = 3.29$ |
| $T_1 = .0543$ | $T_1 = .0538$ |
| $a_2 = .657$ | $a_2 = .892$ |
| $T_2 = .0063$ | $T_2 = .0081$ |
| $a_3 = .579$ | $a_3 = .632$ |
| $T_3 = .0067$ | $T_3 = .0075$ |
| Gain = $a_1+a_2+a_3$ = 4.37 | Gain = $a_1+a_2+a_3$ = 4.81 |

A static measurement at 80 volts with an input change from 79 to 81 volts gave a gain of 4.7. Other values for the orthogonal model constants at different operating levels were determined and set forth in Table I hereinbelow.

TABLE I.—ORTHOGONAL MODEL CONSTANTS AT DIFFERENT OPERATING LEVELS

| Level [1] (Lamp volts) | Model constants | | | | | |
|---|---|---|---|---|---|---|
| | $a_1$ | $T_1$ sec. | $a_2$ | $T_2$ sec. | $a_3$ | $T_3$ sec. |
| 40 | 52.2 | .102 | 29.0 | .040 | 2.78 | .0073 |
| 50 | 31.2 | .077 | 21.8 | .033 | 1.77 | .0086 |
| 60 | 10.78 | .055 | 7.46 | .024 | .596 | .0024 |
| 70 | 3.86 | .041 | 3.00 | .019 | .368 | .0069 |
| 80 | 3.13 | .054 | .657 | .0063 | .579 | .0067 |
| 90 | 1.29 | .043 | .397 | .0059 | .208 | .0075 |

[1] Steady-state value of supply voltage with a rectangular pulse of +10 volts for 20 milliseconds duration input disturbance in each case.

The values in Table I were used in the general expression of the model and a "transfer function" was written for each case. The transfer functions were written in the approximate Laplace forms and exponential series forms of the model functions are set forth in Table II below.

TABLE II.—THE APPROXIMATE LAPLACE FORMS OF THE MODEL FUNCTIONS

| Level* (lamp volts) | Functional | |
|---|---|---|
| | Orthonormal | Exponential |
| 40 | $\dfrac{84(1-.012s+5.9 \times 10^{-5}s^2)}{(.102s+1)(.04s+1)(7.3 \times 10^{-3}s+1)}$ | $\dfrac{84 e^{-.01s}}{(.102s+1)(.04s+1)(7.3 \times 10^{-3}s+1)}$ |
| 50 | $\dfrac{55(1-7 \times 10^{-3}s-2 \times 10^{-5}s^2)}{(.077s+1)(.033s+1)(8.6 \times 10^{-3}s+1)}$ | $\dfrac{55 e^{-.007s}}{(.077s+1)(.033s+1)(8.6 \times 10^{-3}s+1)}$ |
| 60 | $\dfrac{19(1-8 \times 10^{-3}s+2.2 \times 10^{-5}s^2)}{(.055s+1)(.024s+1)(2.4 \times 10^{-3}s+1)}$ | $\dfrac{19 e^{-.008s}}{(.055s+1)(.024s+1)(2.4 \times 10^{-3}s+1)}$ |
| 70 | $\dfrac{7.2(1-3.4 \times 10^{-3}s-7.8 \times 10^{-6}s^2)}{(.041s+1)(.019s+1)(6.9 \times 10^{-3}s+1)}$ | $\dfrac{7.2 e^{-.003s}}{(.041s+1)(.019s+1)(6.9s+1)}$ |
| 80 | $\dfrac{4.4(1-5.8 \times 10^{-3}s+2.1 \times 10^{-5}s^2)}{(.054s+1)(.0067s+1)(6.3 \times 10^{-3}s+1)}$ | $\dfrac{4.4 e^{-.006s}}{(.054s+1)(.0067s+1)(6.3 \times 10^{-3}s+1)}$ |
| 90 | $\dfrac{1.9(1-3.7 \times 10^{-3}s-9.6 \times 10^{-6}s^2)}{(.043s+1)(.0075s+1)(5.9 \times 10^{-3}s+1)}$ | $\dfrac{1.9 e^{-.001s}}{(.043s+1)(.0075s+1)(5.9 \times 10^{-3}s+1)}$ |

*As in Table I.

Inspection of the numerator of each of the expressions in the orthonormal column leads to the conclusion that the $s$ terms are part of the $e^{1T}11$ series. Thus, by ignoring the validity of the sign of the $s^2$ term in some cases, the function is written as shown in the exponential columns of Table II.

Since most commercially available controllers are available in three modes, namely reset, proportional, and rate, it can be seen that the process order is higher than the order of these controllers. If the process were of the same order as the controller, it would be possible to completely compensate the system. However, in the present case it was necessary to use astute judgement in selecting the predominant quantities. The values of $K_i$, $K_p$ and $K_d$ at different levels were calculated in this way by using the Laplace transforms set forth in Table II. These controller constants for each level of $K_i$, $K_p$, and $K_d$ are set forth in Table III hereinbelow.

TABLE III.—VALUES OF CONTROLLER CONSTANTS FOR VARIOUS OPERATING LEVELS

| Level [1] (Lamp volts) | Controller constants | | |
|---|---|---|---|
| | $K_i$ | $K_p$ | $K_d$ |
| 40 | .11 | .017 | .0005 |
| 50 | .24 | .026 | .0006 |
| 60 | .96 | .076 | .0010 |
| 70 | 3.40 | .203 | .0030 |
| 80 | 4.20 | .260 | .0020 |
| 90 | 12.00 | .620 | .0040 |

[1] For an increasing 10 volt step. It is possible to experience instability when the same values are used with a decreasing step. The results of the rapid process simulator were checked in each of these cases by using a controller set to the controller constant values in Table III in the control of the intensity of the light bulbs.

By close examination of Table III, it can be seen that the controller parameters $K_i$ (the reset gain), $K_p$ (the proportional gain), and $K_d$ (the rate gain), should be made some function of the level of operation. Logarithmic plots of these functions demonstrated that there was approximately the same relative changes in each parameter for changes in the level (i.e. the controller constants calculated in each case are essentially only a function of the open loop gain). In the present example, the approximate function of operating level compensation was to interpose in the error signal; a gain equal to 0.0014 $e^{L/10}$, where $L$ is the lamp level in volts. Coupled with this, the fixed controller values were adjusted to $K_i$=12, $K_p$=0.62 and $K_d$=0.004. This adjustment gave good control at all levels of operation without readjustment.

Example 2

The following example describes the method of determining the process characteristic of an actual process by the employment of noninteracting elements with the rapid process simulator. The unknown system was a closed loop system, substantially as illustrated in FIG. 5 and included a storage tank 300 having a charge of fluid. The storage tank 300 was provided with a discharge line 301 which was connected to a pump 302 capable of moving the fluid in the tank to an air-to-open control valve 303. The valve was a Fisher-Governor 667A split body Z which was operable on 3—15 p.s.i. air-to-open pressure. The fluid was pumped at a rate of approximately 5 gallons per minute by the pump at 40 p.s.i.g. The pump 302 was operated at a constant speed pumping the water through an orifice 304 which was interposed in a line 305 connecting the pump 302 to the valve 303. The water was also pumped through the valve 303 and the storage tank 300. A type 360 Fisher-Governor valve positioner 306 was used with the control valve 303 and the positioner 306 was equipped with a bypass line 307. A differential pressure transducer 308 was connected across the orifice 304 in the manner as illustrated in FIG. 5 for sensing the change in pressure differential due to the change in the valve 303. An electropneumatic transducer 309 was connected to a bypass valve 309' which, in turn, permitted a signal to be applied to either the valve 303 or the valve positioner 306 in the manner as illustrated in FIG. 5. Accordingly, the valve 303 was operated directly by the electropneumatic transducer 309 or with the electropneumatic transducer 309 and the positioner 306. The output lines of the differential pressure transducer and the input lines of the electropneumatic transducer were in turn connected to the rapid process simulator, which is schematically illustrated with the basic component for the purposes of illustrating the operation of the simulator with the system of this example. One terminal of the electropneumatic transducer 309 was connected directly to a steady-state amplifier 310 in the simulator A and one terminal of the electropneumatic transducer was grounded. Similarly, one terminal of the differential pressure transducer was connected directly to a differential pressure output amplifier 311 and one terminal of the differential pressure transducer was grounded to the rapid process simulator A. The steady-state level amplifier was connected to a pulse generator 312 which was also connected to an orthogonal model 313. The orthogonal model 313 was, in turn, connected to the differential pressure output amplifier and to an integrator 314, which was in turn monitored by a readout voltmeter (not shown).

The first type of electropneumatic transducer used was a Fisher-Governor type 543, operable at 1—5 milliamperes and 3—15 p.s.i.g. The second transducer was a Microsen V–443 transducer capable of operating at 1—5 milliamps and 3—15 p.s.i.g. The orifice in the flow line was sized to give 100 inches of water column pressure differential for a 0—5 gallons per minute flow change.

The differential pressure transducer was used with the Microsen type M-200 with an output of 1—5 milliamperes when coupled with the orifice. This was loaded with a 1,000 ohm resistor to convert signals to 1—5 volts for compatibility with the rapid process simulator.

It can be seen that the fluid pumped from the storage tank through the valve and back to the storage tank constituted a complete cycle. The differential pressure transducer provided the measure of flow and the control valve accepted a correction signal through its positioner or directly through the control flow. The output of the differential pressure cell was compared to the output of the model at the model amplifier on an integral of the (error)$^2$ basis. Simultaneously, the pulse generator fed a pulse to the electropneumatic transducer which provided a pressure signal to pulse the valve either directly or through the valve positioner. The steady-state amplifier provided a steady-state signal for the purpose of matching static signals.

The steady-state flow rate level was selected at the output of the rapid process simulator by a potentiometer controlling the steady-state level amplifier and the corresponding output of the differential pressure transducer was then subtracted out by the potentiometer operating the steady-state differential pressure output amplifier. A rectangular pulse was then generated in the rapid process simulator and of sufficient magnitude and duration to excite the dynamics of the total system. The pulse was then impressed on the process and the orthogonal model simultaneously.

The time integral of the square of the difference of the change in the differential pressure output and the model output was then recorded. The values of model coefficients and time constants were varied until the value of this integral was a minimum. The degree of fit was defined by the following relationship:

$$\text{Percent fit} = \frac{\int (\text{Error})^2 \, dt_{\text{minimum}}}{\int (\text{Error})^2 \, dt_{\text{no correction}}} \times 100$$

An oscillograph recording was made when the Fisher-Governor electropneumatic transducer was used with and without the valve positioner. Next, an oscillograph recording was used to produce a process output curve from the differential pressure transducer. Similarly, an oscillograph recording was used to produce the model output, the error signal and the integral of the error signal squared. This system of curves is illustrated in FIGS. 6a—6e, where the electropneumatic input curve is represented by FIG. 6a, the differential pressure or process output curve is represented by FIG. 6b, the model output curve is represented by FIG. 6c, the differential pressure output minus the model output or error curve is illustrated in FIG. 6d, and the integral of the error squared with respect to time is indicated in FIG. 6e.

The degree of fit in this particular case was found to be 88 percent and the characteristic function of the process was determined as:

$$H(s) = .760 \frac{1 + .227s}{(1 + .765s)(1 + .054s)}$$

It can be seen by reference to FIG. 6b that the output of the differential pressure transducer and consequently, the error signal contains some random high frequency disturbances. In order to keep this from being integrated in the integral error squared device, a filter was added to the differential pressure cell output. The model was then readjusted for the best fit. The degree of fit was then found to be 92 percent. The model characteristic function was found to be:

$$H(s) = .638 \frac{1 + .289s}{(1 + .765s)(1 + .054s)}$$

The Fisher-Governor valve positioner was then added and a fit was attempted without a filter on the differential pressure transducer signal. Again, oscillograph recordings of each of the five curves was made and the percent of fit was found to be 87 percent. The model characteristic function without the positioner was found to be:

$$H(s) = .715 \frac{1 + .237s}{(1 + .495s)(1 + .052s)}$$

The system was then modified by removing the Fisher-Governor electropneumatic transducer and replacing it with the Microsen V–443 transducer. The positioner was removed and the first order filter was added to the differential pressure output to reduce noise. Again, oscillograph recordings were used to produce each of the five aforementioned plots. The fit was approximately 99 percent complete and the model characteristic function was:

$$H(s) = .220 \frac{1 + .275s}{(1 + 2.91s)(1 + .0225s)}$$

The valve positioner was then added to the above described system with the Microsen V-443 electropneumatic transducer. Due to the fact that the system response was greatly increased, the first order filter was removed from the differential pressure transducer output so that the filter would provide no contribution to the transfer function. Similarly, oscillograph recordings were made to produce the five above described curves. The degree of fit was 86 percent and the model characteristic function was:

$$H(s) = .493 \frac{1 + .126s}{(1 + .369s)(1 + .0225s)}$$

It should be understood that changes and modifications in the form, construction, arrangement and combination of parts presently described and pointed out may be made and substituted for those herein shown without departing from the nature and principle of our invention.

Having thus described our invention, what we desire to claim and secure by Letters Patent is:

We claim:

1. A pulse generator for producing square and ramp wave pulses, said generator comprising means for receiving a triangular wave input signal, first and second relay comparator circuits operatively connected to said last named means for receiving triangular wave signals, first energizable means in said first circuit operating a plurality of first contacts for producing a square wave, second energizable means in said second circuit operating a plurality of second contacts for producing a ramp wave, pulse selecting circuit means operatively connected to each of said plurality of first and second contacts, and switch means for causing said selector circuit to function as an inverter circuit to produce a square wave output and for causing said selector circuit to function as an integrator circuit to produce a ramp wave output.

2. The pulse generator of claim 1 for producing square and ramp wave pulses further characterized in that potentiometer means is operatively connected to each of said relay comparator circuits for adjusting the commencement time of said pulses and the duration time of each of said pulses.

3. A pulse generator for producing square and ramp wave pulses, said generator comprising wave producing means for providing a triangular wave input signal, first and second relay comparator circuits operatively connected to said last-named means for receiving triangular wave signals, first energizable means in said first circuit operating a plurality of first contacts for producing a square wave, second energizable means in said second circuit operating a plurality of second contacts for producing a ramp wave, first pulse selecting circuit means operatively connected to each of said plurality of first and second contacts, third and fourth relay comparator circuits operatively connected to said wave producing means for receiving triangular wave signals, third energizable means in said third circuit operating a plurality of third contacts for producing a delay square wave, fourth energizable means in said fourth circuit operating a plurality of fourth contacts for producing a delay ramp wave, second pulse selecting circuit means operatively connected to each of said plurality of third and fourth contacts, and switch means for causing said selector circuits to function as inverter circuits to produce a square wave output and for causing said selector circuits to function as integrator circuits to produce a ramp wave output.

4. The pulse generator for producing square and ramp wave pulses of claim 1 further characterized in that means is provided for adjusting the transport delay time that said third and fourth selector circuits delay their output signal with respect to said first and second selector circuits.